(12) United States Patent
Askar et al.

(10) Patent No.: US 11,533,074 B2
(45) Date of Patent: Dec. 20, 2022

(54) FULL-DUPLEX TRANSCEIVER APPARATUS

(71) Applicant: Fraunhofer-Gesellschaft zur Foerderung der angewandten Forschung e.V., Munich (DE)

(72) Inventors: Ramez Askar, Berlin (DE); Wilhelm Keusgen, Berlin (DE); Thomas Haustein, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 246 days.

(21) Appl. No.: 16/850,868

(22) Filed: Apr. 16, 2020

(65) Prior Publication Data

US 2020/0244301 A1 Jul. 30, 2020

Related U.S. Application Data

(63) Continuation of application No. PCT/EP2018/078746, filed on Oct. 19, 2018.

(30) Foreign Application Priority Data

Oct. 20, 2017 (EP) ..................................... 17197532

(51) Int. Cl.
*H04B 1/40* (2015.01)
*H04B 1/04* (2006.01)
*H04B 1/18* (2006.01)
(52) U.S. Cl.
CPC ............. *H04B 1/40* (2013.01); *H04B 1/0458* (2013.01); *H04B 1/18* (2013.01)
(58) Field of Classification Search
CPC ........... H04B 1/40; H04B 1/0458; H04B 1/18
See application file for complete search history.

(56) References Cited

U.S. PATENT DOCUMENTS

2009/0160576 A1 6/2009 Dent
2010/0048146 A1 2/2010 Mccallister
(Continued)

FOREIGN PATENT DOCUMENTS

WO WO-2015001116 A1 * 1/2015 ............... H03C 1/12

OTHER PUBLICATIONS

Ahmed, Elsayed, et al., "Self-interference cancellation with non-linear distortion suppression for full-duplex systems", in Signals, Systems and Computers, 2013 Asilomar Conference on, 2013, pp. 1199-1203, pp. 1199-1203.
(Continued)

*Primary Examiner* — Elton Williams
(74) *Attorney, Agent, or Firm* — Perkins Coie LLP; Michael A. Glenn

(57) ABSTRACT

A full-duplex transceiver apparatus includes a plurality of antennas, the plurality of antennas including a first antenna and a second antenna, a first transmit front-end for feeding the first antenna, a first receive front-end for receiving a remotely-generated signal via the second antenna, and a matching network between the plurality of antennas and the transmit and receive front-ends for feeding the first antenna from the first transmit front-end and for delivering the remotely-generated signal from the second antenna to the first receive front-end. The matching network is a lossless reciprocal network causes a cancellation of the self-interference at the second antenna. The lossless reciprocal network has a first antenna port connected to the first antenna, a second antenna port connected to the second antenna, a first front-end port connected to the first transmit front-end, and a second front-end port connected the first receive front-end.

17 Claims, 12 Drawing Sheets

(56) References Cited

U.S. PATENT DOCUMENTS

| | | | |
|---|---|---|---|
| 2013/0155913 A1 | 6/2013 | Sarca | |
| 2014/0139218 A1* | 5/2014 | Findeklee | G01R 33/3628 |
| | | | 324/318 |
| 2014/0300431 A1* | 10/2014 | Lynch | H01Q 21/14 |
| | | | 333/100 |
| 2016/0336994 A1 | 11/2016 | Sarca | |
| 2018/0331408 A1* | 11/2018 | Reiskarimian | H04B 1/44 |

OTHER PUBLICATIONS

Ahmed, Elsayed, et al., "Self-interference cancellation with phase noise induced ici suppression for full-duplex systems", in Global Communications Conference (GLOBECOM), 2013 IEEE, 2013, pp. 3384-3388, pp. 3384-3388.

Allen, B L, et al., "Mutual coupling in array antennas", Massachusetts Inst of Tech Lexington Lincoln Lab, Tech. Rep., 1966, 1966, uploaded in 2 parts.

Andersen, J Bach, et al., "Decoupling and descattering networks for antennas", IEEE Transactions on Antennas and Propagation, vol. 24, No. 6, Nov. 1976, Nov. 1976.

Anttila, Lauri, et al., "Cancellation of power amplifier induced nonlinear self-interference in full-duplex transceivers", in Signals, Systems and Computers, 2013 Asilomar Conference on, 2013, pp. 1193-1198, pp. 1193-1198.

Askar, Ramez, et al., "Active self-interference cancellation mechanism for full-duplex wireless transceivers", in Cognitive Radio Oriented Wireless Networks and Communications (CROWNCOM), 2014 9th International Conference on, Jun. 2014.

Askar, Ramez, et al., "Agile Full-Duplex transceiver: The concept and Self-Interference channel characteristics", in European Wireless 2016; 22th European Wireless Conference, 2016.

Askar, Ramez, et al., "Analysis of Utilizing Lossless Networks for Self-Interference Cancellation Purpose", 2018 IEEE Wireless Communications and Networking Conference (WCNC), Barcelona, 2018, pp. 1-6, doi: 10.1109/WCNC.2018.8377351, pp. 1-6.

Askar, Ramez, et al., "Full-Duplex wireless transceiver in presence of I/Q mismatches: Experimentation and estimation algorithm", in IEEE GC 2015 Workshop on Emerging Technologies for 5G Wireless Cellular Networks—4th International (GC'15—Workshop—ET5G), San Diego, USA, Dec. 2015.

Askar, Ramez, et al., "I/Q imbalance calibration for higher self-interference cancellation levels in full-duplex wireless transceivers", in 5G for Ubiquitous Connectivity (5GU), 2014 1st International Conference on, 2014, pp. 92-97, pp. 92-97.

Bharadia, Dinesh, et al., "Full duplex backscatter", in Proceedings of the Twelfth ACM Workshop on Hot Topics in Networks, ser. HotNets-XII. ACM, 2013, pp. 4:1-4:7, pp. 4:1-4:7.

Bharadia, Dinesh, et al., "Full duplex MIMO radios", in 11th USENIX Symposium on Networked Systems Design and Implementation (NSDI 14). USENIX Association, Apr. 2014.

Bharadia, Dinesh, et al., "Full duplex radios", in Proceedings of the ACM SIGCOMM 2013 conference on SIGCOMM, ser. SIGCOMM '13, 2013.

Choi, Jung, et al., "Achieving single channel, full duplex wireless communication", in Proceedings of the sixteenth annual international conference on Mobile computing and networking, ser. MobiCom '10, 2010.

Dinc, Tolga, et al., "A 60 GHz same-channel full-duplex CMOS transceiver and link based on reconfigurable polarization-based antenna cancellation", in Radio Frequency Integrated Circuits Symposium (RFIC), 2015 IEEE, 2015, pp. 31-34, pp. 31-34.

Duarte, Melissa, et al., "Experiment-driven characterization of full-duplex wireless systems", Wireless Communications, IEEE Transactions on, vol. 11, No. 12, Dec. 2012.

Duarte, Melissa, et al., "Full-duplex wireless communications using off-the-shelf radios Feasibility and first results", in Signals, Systems and Computers (ASILOMAR), 2010 Conference Record of the 44th Asilomar Conference on, 2010, pp. 1558-1562, pp. 1558-1562.

Estep, Nicholas A, et al., "Magnetic-free non-reciprocity and isolation based on parametrically modulated coupled-resonator loops", Nat Phys, vol. 10, No. 12, pp. 923-927, 2014. [Online]. Available: http://dx.doi.org/10.1038/nphys3134, Dec. 2014, pp. 923-927.

Everett, Evan, et al., "Empowering full-duplex wireless communication by exploiting directional diversity", in Signals, Systems and Computers (ASILOMAR), 2011 Conference Record of the Forty Fifth Asilomar Conference on, 2011, pp. 2002-2006, pp. 2002-2006.

Everett, Evan, et al., "Passive self-interference suppression for full-duplex infrastructure nodes", Wireless Communications, IEEE Transactions on, vol. PP, No. 99, pp. 1-15, 2014, pp. 1-15.

Gholian, Armen, et al., "A numerical investigation of all-analog radio self-interference cancellation", in Signal Processing Advances in Wireless Communications, 2014 IEEE 15th International Workshop on, 2014, pp. 459-463, pp. 459-463.

Heino, Mikko, et al., "Recent advances in antenna design and interference cancellation algorithms for in-band full duplex relays", Communications Magazine, IEEE, vol. 53, No. 5, pp. 91-101, May 2015, pp. 91-101.

Hua, Yingbo, et al., "Blind digital tuning for interference cancellation in fullduplex radio", in Signals, Systems and Computers, 2014 48th Asilomar Conference on, Nov. 2014, pp. 1691-1695, pp. 1691-1695.

Hua, Yingbo, et al., "Breaking the barrier of transmission noise in full-duplex radio", in Military Communications Conference, MILCOM 2013—2013 IEEE, Nov. 2013, pp. 1558-1563, pp. 1558-1563.

Hua, Yingbo, et al., "Radio self-interference cancellation by transmit beamforming, all-analog cancellation and blind digital tuning", Signal Processing, vol. 108, 2015.

Jain, Mayank, et al., "Practical, real-time, full duplex wireless", in Proceedings of the 17th annual international conference on Mobile computing and networking, ser. MobiCom '11, 2011.

Khojastepour, Mohammad A, et al., "The case for antenna cancellation for scalable full-duplex wireless communications", in Proceedings of the 10th ACM Workshop on Hot Topics in Networks, ser. HotNets-X. ACM, 2011, pp. 17:1-17:6, Nov. 14, 2011, pp. 17:1-17:6.

Kolodziej, K E, et al., "Adaptive RF canceller for transmit-receive isolation improvement", in Radio and Wireless Symposium (RWS), 2014 IEEE, Jan. 2014, pp. 172-174, Jan. 2014, pp. 172-174.

Kolodziej, K E, et al., "Ring array antenna with optimized beamformer for simultaneous transmit and receive", in Antennas and Propagation Society International Symposium (APSURSI), 2012 IEEE, Jul. 2012, pp. 1-2, Jul. 2012, pp. 1-2.

Korpi, Dani, et al., "Advanced self-interference cancellation and multiantenna techniques for full-duplex radios", in Signals, Systems and Computers, 2013 Asilomar Conference on, Nov. 2013, pp. 3-8, pp. 3-8.

Korpi, Dani, et al., "Full-duplex transceiver system calculations: Analysis of ADC and linearity challenges", Wireless Communications, IEEE Transactions on, vol. PP, No. 99, pp. 1-1, 2014, pp. 1-1.

Korpi, Dani, et al., "Widely linear digital self-interference cancellation in direct-conversion full-duplex transceiver", Selected Areas in Communications, IEEE Journal on, vol. 32, No. 9, pp. 1674-1687, Sep. 2014, pp. 1674-1687.

Laughlin, Leo, et al., "A widely tunable full duplex transceiver combining electrical balance isolation and active analog cancellation", in Vehicular Technology Conference (VTC Spring), 2015 IEEE 81st, May 2015.

Laughlin, Leo, et al., "Electrical balance isolation for flexible duplexing in 5g mobile devices", in Communication Workshop (ICCW), 2015 IEEE International Conference on, Jun. 2015.

Laughlin, Leo, et al., "Optimum single antenna full duplex using hybrid junctions", Selected Areas in Communications, IEEE Journal on, vol. 32, No. 9, Sep. 2014.

Manuzzato, Enrico, et al., "Digitally controlled electrical balance duplexer for transmitter-receiver isolation in full-duplex radio", in European Wireless 2016; 22th European Wireless Conference, May 2016.

McMichael, Joseph G., et al., "Optimal tuning of analog self-interference cancellers for fullduplex wireless communication", in

(56) References Cited

OTHER PUBLICATIONS

Communication, Control, and Computing (Allerton), 50th Annual Allerton Conference on, Oct. 2012, pp. 246-251, Oct. 2012, pp. 246-251.

Nie, Ding, et al., "Systematic design of large-scale multiport decoupling networks", IEEE Transactions on Circuits and Systems I: Regular Papers, vol. 61, No. 7, Jul. 2014.

Sahai, Achaleshwar, et al., "On the impact of phase noise on active cancelation in wireless full-duplex", Vehicular Technology, IEEE Transactions on, vol. 62, No. 9, Nov. 2013.

Sahai, Achaleshwar, et al., "Pushing the limits of full-duplex: Design and real-time implementation", Rice University, Technical report, Jul. 2011.

Sahai, Achaleshwar, et al., "Understanding the impact of phase noise on active cancellation in wireless full-duplex", in Signals, Systems and Computers (ASILOMAR), 2012 Conference Record of the Forty Sixth Asilomar Conference on, Nov. 2012, pp. 29-33, pp. 29-33.

Syrjälä, Ville, et al., "Analysis of oscillator phase-noise effects on self-interference cancellation in full-duplex ofdm radio transceivers", Wireless Communications, IEEE Transactions on, vol. 13, No. 6, Jun. 2014.

Wallace, Jon W, et al., "Termination-dependent diversity performance of coupled antennas network theory analysis", IEEE Transactions on Antennas and Propagation, vol. 52, No. 1, Jan. 2004, Jan. 2004.

Wasylkiwskyj, Wasyl, et al., "Theory of mutual coupling among minimum-scattering antennas", IEEE Transactions on Antennas and Propagation, vol. 18, No. 2, Mar. 1970.

* cited by examiner

FULL-DUPLEX TRANSCEIVER APPARATUS

CROSS-REFERENCES TO RELATED APPLICATIONS

This application is a continuation of International Application No. PCT/EP2018/078746, filed Oct. 19, 2018, which is incorporated herein by reference in its entirety, and additionally claims priority from European Application No. EP 17 197 532.9, filed Oct. 20, 2017, which is incorporated herein by reference in its entirety.

BACKGROUND OF THE INVENTION

The present application concerns the field of wireless communications, more specifically a full-duplex transceiver apparatus, which may be included in one or more entities of a wireless communication network or system. Embodiments relate to a full-duplex transceiver apparatus implementing an energy-saving RF-based self-interference (SI) cancelation technique.

FIG. 1 is a schematic representation of an example of a wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNIB_1$ to $gNB_5$ may connected, e.g. via the X1 or X2 interface, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For example, in a wireless communication network as depicted in FIG. 1, like a LTE or 5G/NR network, the increasing demands for higher data rates and lower latency services involves the wireless communication network operating more efficiently and utilizing the radio resources wisely. To meet such demands, the respective entities of the wireless communication network, like the base stations and/or the user devices, may include a full-duplex transceiver. Full-duplex is a duplexing scheme that doubles the spectral utilization efficiency and eases the radio resource allocation, allows the network entities or nodes to communicate over the same frequency band and without discontinuity in time.

However, the realization of the full duplex scheme is hampered by what is called the self-interference phenomenon causing a leak from the transmitter to the receiver. For example, in a first full-duplex transceiver antenna constellation having a single antenna with a circulator connectivity to the transmit and receive chains, the antenna impedance mismatch and the circulator imperfection are responsible for a significant leak from the transmitter to the receiver (see reference [1]). In a second full-duplex transceiver antenna constellation having transmit and receive antennas, a self-interference signal may be coupled into the receive antenna.

When considering the second full-duplex transceiver antenna constellation, the coupling of the self-interference signal may be described by means of the mutual coupling phenomenon among the transmit and receive antennas (see reference [2]). The self-interference signal may be caused by backscatter signals, i.e., parts of a signal transmitted by the transmit antenna of the full-duplex transceiver, which are reflected back to the receive antenna of the full-duplex transceiver, e.g., due to multipath channel reflections. The self-interference signal may also be caused due to the physical proximity between the transmit antenna, also referred to as the local transmitter, and the receive antenna, also referred to as the local receiver, which may cause a significant portion of the transmit signal to couple directly into the local receiver. In any case, the self-interference caused due to the physical proximity between the local transmitter and the local receiver, potentially in addition to the self-interference caused by backscatter, results in spreading the self-interference signal over a vast dynamic range. Therefore, an RF self-interference cancellation is implemented in a full-duplex transceiver in order to reduce the self-interference to an acceptable level.

A variety of self-interference cancellation techniques are known in the art to achieve a physically secured wireless link between two nodes or entities of the wireless communication network. FIG. 2 is a diagram illustrating the general categorization of self-interference cancellation (SIC) techniques according to where the cancellation of the self-interference signal takes place. Alongside the diagram, a receiving chain 200 is shown to illustrate at which location the self-interference is cancelled by the respective cancellation category. The receiving chain 200 includes in the RF domain 202 a receive antenna 204 and a low noise amplifier 206 to which the receive antenna 202 is coupled. A signal received at the receive antenna 204 and amplified by the low noise amplifier 206 is further processed in the analog domain 210. The analog domain 210 includes the local oscillator 212, the mixer 214, the low pass filter 216 and the analog-digital transducer 218. The signal received from the RF domain 202 is down-mixed, low pass filtered and converted into the digital domain 220 for further processing.

In FIG. 2, the categories, which have drawn much of attention in the recent published literature, are the digital domain cancellation and the RF domain cancellation. The analog domain cancellation performs SIC on the basis of the analog baseband signal, unlike the RF domain cancellation in accordance with which the SIC is performed on the basis of the up-converted signal in the analog RF domain 202. However, the analog domain cancellation, where the SI signal is cancelled in the analog domain 210 after the down-conversion 214 and before the ADC 218 (see reference [3]), does not offer any competitive advantages compared the to the RF domain cancellation.

Digital Self-Interference Cancellation

Many algorithms and signal models have been explored in the published literature for implementing the digital self-interference cancellation. Some approaches consider a linear model due to its simplicity. However, the linear model suppresses only the linear part of the residual self-interference signal in the digital domain, which is not sufficient in practical systems (see reference [18]). Other approaches are based on widely-linear models to increase the digital suppression amount (see reference [24]). Yet other approaches exploit even non-linear models to improve the performance of the residual self-interference suppression in the digital domain (see references [27], [26], [25] and [18]).

RF Domain Cancellation

The RF domain cancellation techniques may be passive by attenuating the self-interference signal, referred to in the following as attenuation approaches, or active by adding a SIC signal to the RF reception signal, referred to in the following as signal-injection approaches.

Attenuation Approaches

Attenuation based SIC approaches offer a first stage self-interference suppression method and accordingly reduce the interference requirement for any following cancellation stages. At the beginning of the full-duplex (FD) research, a SIC technique based on a specific placement of antennas was proposed (see references [4] and [5]). This cancellation technique involves two transmit antennas being spaced apart from the receiver antenna by distances d and $$d + \frac{\lambda}{2}.$$

In that way the two transmit antennas produce a null in their antenna pattern at the receiver antenna location. However, this cancellation technique works well only for narrowband systems, and around 30 dB of self-interference suppression at the center frequency is achieved. Other approaches attempt to overcome the just mentioned drawback, and reduce the number of the antennas that may be used (see references [6], [7], [8] and [9]). These approaches also make use of the directivity of the antennas in combination with other techniques such as the physical separation of the antennas, different polarizations and additional RF absorbing materials (see references [10], [11], [12] and [13]).

The passive cancellation approach achieves the highest cancellation result in conditions where the transmit and receive antennas are oriented in two opposite directions, which may be suitable for relay station scenarios (see references [14] and [15]), and more than 65 dB of suppression was measured over ~165 MHz.

Further improvements are achieved by broadening the SIC bandwidth. In accordance with reference [16] an antenna structure is provided in which eight transmit monopole antennas are placed equidistantly in a ring shape, and the receive monopole antenna is mounted at an elevated position in the center of the ring structure. Unlike the above mentioned $$\frac{\lambda}{2}$$

two-antennas-relative-distance approach, a progressive phase shift of 180° is applied to each opposite pair of transmit monopoles by means of an RF 180°-hybrid (analog beamformer circuitry). An overall self-interference suppression greater than 55 dB is achieved for this implementation, over a frequency band between 2.4 GHz and 2.5 GHz.

Another known element to connect one antenna with the transmit and receive chain is the 3-port RF-circulator, which is used to attenuate the Tx-to-Rx leakage (first-tap component of the self-interference radio channel) by benefiting from the anisotropic property of the RF-circulator (see reference [17]). The RF-circulator element may be used as a part of the entire self-interference mechanism, and may achieve 10 dB-15 dB of passive self-interference suppression (see references [18], [19] and [20]).

The above described passive techniques show high SIC results for the main (first tap) self-interference component, however, they are vulnerable against reflections and back-scattering from the wireless channel, causing a frequency-selective behavior of the self-interference signal. A major drawback of the RF-circulator approach is the reflection at the antenna port due to impedance mismatch. In practical systems, the self-interference component may dominate the circulator leakage and hence limits the suppression performance to the reflection factor of the attached antenna.

Signal-Injection Approaches

In the area of RF-injection techniques, reference [6] introduces an RF Balun (balanced-to-unbalanced transformer) to produce a negative version of the self-interference signal—as used historically for echo cancellation in telephones. This concept may be enhanced by including an active circuitry (QH×220 chip) for adapting the attenuation and the delay of the (negative) cancellation signal. For a bandwidth of 40 MHz, over 45 dB SIC was reached by means of the Balun setup, with a loss in the link-budget of around 6 dB. However, this approach has a serious practical limitation due to the additional nonlinearities that the active circuitry introduces into the SIC signal.

In contrast to the use of a Balun, references [7], [8] and [9] suggest using a 180°-hybrid transformer to generate the inverted version of the self-interference signal. By means of a digitally-controlled impedance-matching circuit the reflecting factor of the antenna is matched to suppress the self-interference through the RF-hybrid junction connectivity.

However, this approach also compromises the link budget by 6 dB, similar to the balun based approach. Further, both approaches are limited to the cancellation of the main (first tap) self-interference component.

One of the most prominent approaches in the RF-injection category is the use of an auxiliary transmitter as is described in references [21], [13], [22], [19], [23], [9] and [20]. This approach involves an additional or auxiliary transmission chain alongside the ordinary transmission chain. The additional chain is dedicated to replicate an inverted version of the self-interference signal and injects it at the receiver RF front-end to cancel the self-interference. Generating the SIC signal starts from I/O samples at the digital domain. This enables the implementation of several digital-signal-processing (DSP) algorithms in which the multipath self-interference wireless channel is included in the waveform of the SIC signal. Despite the flexibility that the active cancellation technique establishes by considering the whole self-interference wireless channel, this technique suffers from issues RF chains, such as the I/O imbalances (see references [23], [24] and [20]), the non-linear behavior of the components (see references [19], [25], [26] and [27]), and the local oscillator phase noise (see references [28], [3] and [29]). As a matter of fact, the non-deterministic nature of these impairments, for example, the phase noise, are the bottleneck in the active cancellation mechanism. For example the phase noise of the local oscillator limits the performance of the active cancellation mechanism (see references [28] and [3]), even though the same local oscillator is used for both transmit chains—the ordinary transmitter and the auxiliary transmitter. This is due to the fact that the self-interference signal travels through the ordinary transmission chain followed by a multipath radio channel, and accordingly is subjected to different delay values when compared to the SIC signal that only goes through the auxiliary transmission chain. The transmitter-generated noise is another limitation of this approach as it is generated independently at the ordinary and auxiliary transmitter chains (see reference [30]).

Another RF-injection technique focuses on the direct generation of a correlated cancellation signal in order to overcome the shortcomings of the auxiliary transmitter approach. This cancellation technique is based on a printed circuit board (PCB) with multiple routes having a different length in order to provide several delays. The multiple routes (taped delay lines) are supported with digitally-controlled adjustable attenuators. The entire design is used to imitate the circulator leakage and the antenna impedance-mismatch reflection (see references [18] and [31]). However, the rest of the multipath self-interference wireless channel cannot be compensated by this setup. Another drawback of this approach is the off-coupling of the SIC signal, which may compromise a significant portion of the transmit power. This approach, in terms of canceling the self-interference, may reach a value of around 72 dB (see reference [18]) at the RF including the circulator suppression, however, it serves only to prove the concept. A real-world wireless transceiver which follows this approach may deal with the implementation of the physical delay routes as progressive delay lines, which are extremely difficult to realize in practice. The extension of this approach to multiple antenna configurations complicates the RF structure (see reference [32]) even more.

Another approach suggests rearranging the delay routes on the PCB structure in a cluster shape, enabling complex channel coefficients to be applied to the SIC signal at the RF domain (see references [33], [34] and [35]). It has been stated that the clustered arrangement for the adjustable delay taps has advantages over the uniform arrangement (see reference [18]) by decreasing the dependency on the carrier frequency. However, the feasibility of the clustered structure in canceling the transmitter generated noise was not investigated.

Yet another approach adopts the same cancellation principle using an RF cancellation circuit which includes, in addition to the fixed delays taps, variable attenuators and phase shifters (see references [36] and [37]). The four-tap-delay structure achieves a minimum of 30 dB of SIC over 30 MHz frequency band.

The above described conventional approaches for RF domain cancellation have the following drawbacks.

The SIC that relies on an additional transmit front-end to inject the SIC signal in the radio frequency (RF) domain, despite their capability of handling multipath components of a backscatter wireless channel, cannot cope with the entire dynamic of the self-interference signal (see references [19], [22] and [9]). Additionally, this technique is sensitive to wireless transceiver hardware impairments (see references [38] and [20]), and cannot replicate the non-deterministic components of the self-interference signal, such as phase noise caused by the local oscillator (see references [3] and [39]). In other words, this mechanism as all other SIC techniques may be complemented with other techniques in order to meet the demanding SIC requirements in full-duplex transceivers.

The RF circuitry techniques split the energy evenly to use one of the halves for self-interference cancellation purposes. Some of those techniques rely on an hybrid RF element (see references [9], [8] and [40]), and others used a 3-dB power divider to couple-off part of the transmit signal for the SIC purpose (see references [18], [32] and [35]). However, this scarifies half of the transmit power at the full-duplex operated transceiver so that, when assuming a point-to-point connection, which is a prominent scenario for a full-duplex bidirectional link with symmetric traffic, the link budget is reduced by 6 dB. Moreover, the corresponding amount for power increment to restore the radiation power requirement leads to push the power amplifier operation point towards the non-linear region.

SUMMARY

According to an embodiment, a full-duplex transceiver apparatus may have: a plurality of antennas, the plurality of antennas including a first antenna and a second antenna, a first transmit front-end for feeding the first antenna, a first receive front-end for receiving a remotely-generated signal via the second antenna, and a matching network between the plurality of antennas and the transmit and receive front-ends for feeding the first antenna from the first transmit front-end and for delivering the remotely-generated signal from the second antenna to the first receive front-end, wherein the matching network is a lossless reciprocal network causing a cancellation of the self-interference at the second antenna, the lossless reciprocal network having a first antenna port connected to the first antenna, a second antenna port connected to the second antenna, a first front-end port connected to the first transmit front-end, and a second front-end port connected the first receive front-end.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
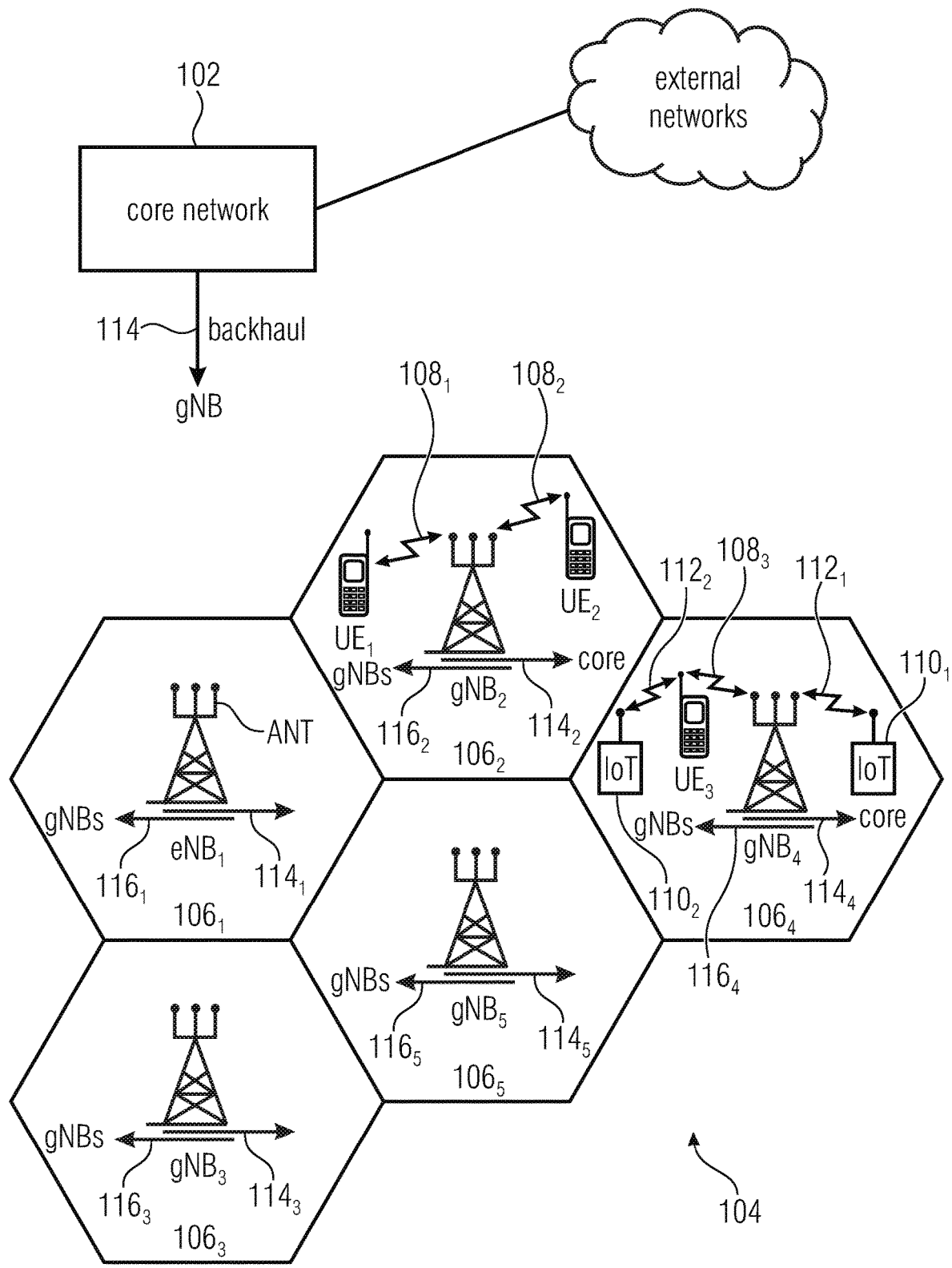
FIG. 1 shows a schematic representation of an example of a wireless communication system.
Figure 2:
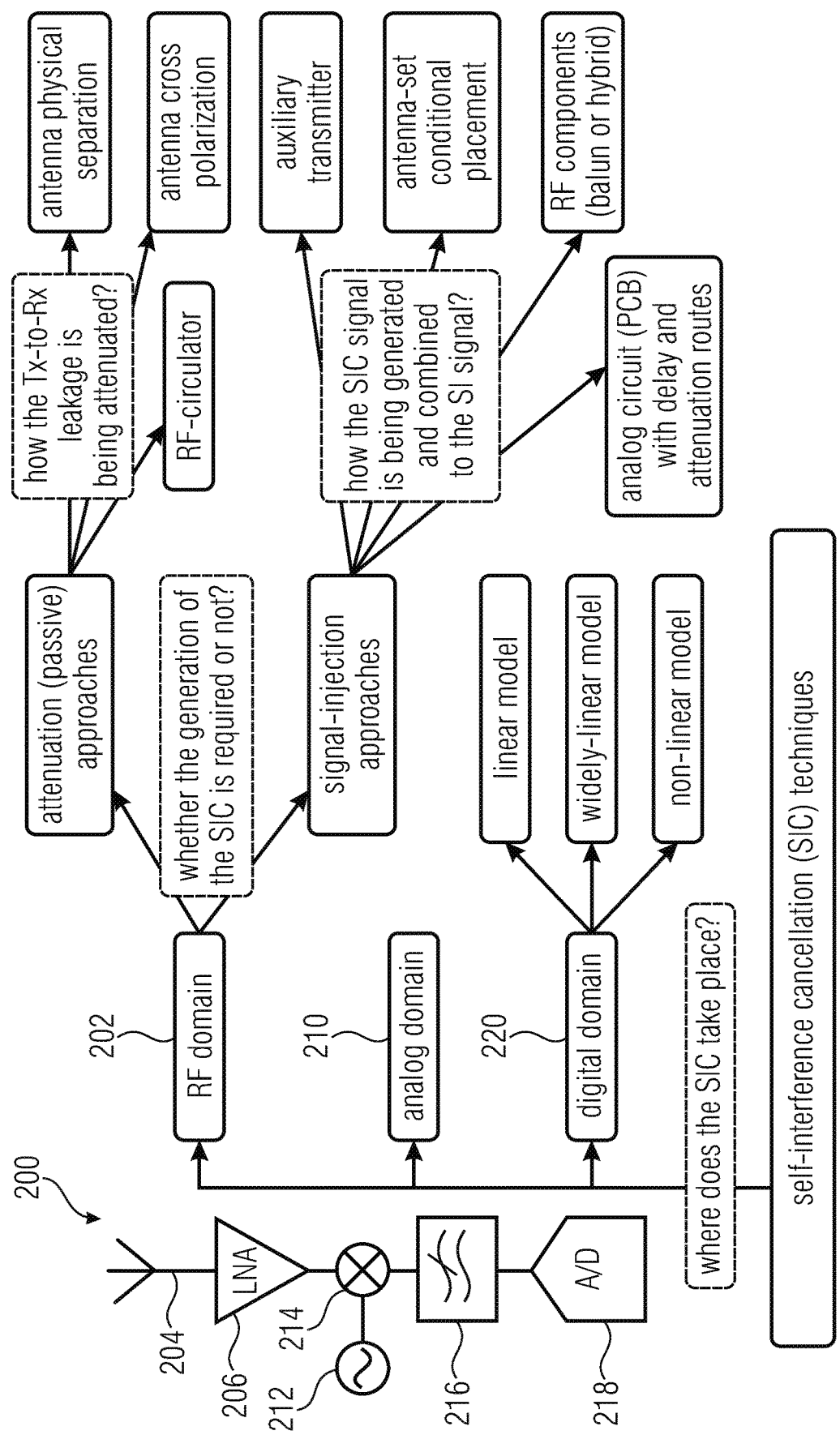
FIG. 2 is a diagram illustrating the general categorization of self-interference cancellation techniques according to where the cancellation of the self-interference signal takes place.

Embodiments of the present invention is now be described in more detail with reference to the accompanying drawings in which the same or similar elements have the same reference signs assigned.

The present invention provides a full-duplex transceiver apparatus, comprising a plurality of antennas, the plurality of antennas including a first antenna and a second antenna, a first transmit front-end for feeding the first antenna, a first receive front-end for receiving a remotely-generated signal via the second antenna, and a matching network between the plurality of antennas and the transmit and receive front-ends for feeding the first antenna from the first transmit front-end and for delivering the remotely-generated signal from the second antenna to the first receive front-end, wherein the matching network is a lossless reciprocal network causing a cancellation of the self-interference at the second antenna, the lossless reciprocal network having a first antenna port connected to the first antenna, a second antenna port connected to the second antenna, a first front-end port connected to the first transmit front-end, and a second front-end port connected the first receive front-end.

In accordance with the present invention a RF-based self-interference cancellation technique is provided which is based on providing a lossless network to connect the antenna structure of the associated front-ends, which decouples the transmit antenna(s) from the receive antenna(s).

The inventive approach provides a self-interference suppression technique in the radio-frequency domain using the lossless network, which has the following advantages over the above described conventional approaches:

The waste of additional energy for cancellation purposes may be avoided.

No additional antenna is needed to serve the SIC purpose such as in some conventional techniques (see references [6] and [4]).

A significant reduction in the self-interference cancellation signal power requirements may be achieved, because the inventive approach is based on decoupling, and, therefore, there is no need to couple-off a part of the transmit signal for SIC purposes.

An implicit impedance matching treatment may be provided that maximizes the energy transfer to/from the transmit/receive antenna elements (see reference [41]), thereby providing for an optimized power delivery among the antenna array elements and the transceiver front-ends.

A scalability to a multiple-input-multiple-output (MIMO) antenna configuration may be obtained that embraces the full-duplex as duplexing scheme.

A frequency-agile wireless transceiver (software-defined radio) may be realized (see reference [1]) that may support a frequency tuning feature.

In accordance with embodiments, the self-interference cancellation technique described herein may be used in an agile full-duplex wireless transceiver and relies on the lossless decoupling network that interconnects the transceiver's chains to the antenna elements. The lossless network may include reactive components, which may be computed to suppress the self-interference at the local receivers for one or more targeted frequencies.

In accordance with embodiments the plurality of antennas are located relative to each other such that a portion of a signal transmitted by the first antenna is coupled into the second antenna.

In accordance with embodiments a portion of a signal transmitted by the first antenna is scattered back towards the full-duplex transceiver apparatus, and the back scattered signal is coupled into the second antenna.

In accordance with embodiments the matching network is configured to match the driving impedance of the first and second antennas.

In accordance with embodiments the matching network includes a plurality of reactive components, like coils, capacitors, microstrip parts or other components having an impedance that is purely or mainly reactive so that there is substantially no energy dissipation within the matching network. Naturally, in practical realizations, the reactive components of the network also have some (parasitic) resistive parts that cause some dissipation.

In accordance with embodiments one or more of the reactive network components are adjustable to compensate tolerances of the reactive network components and/or to match a frequency or multiple frequencies to be used by the full-duplex transceiver.

In accordance with embodiments the full-duplex transceiver apparatus comprises a baseband processor configured to select values for the one or more adjustable reactive network components for compensating the tolerances of the reactive network components and/or for matching the frequency or multiple frequencies to be used, and a controller, like a DSP (digital signal processor), a DSP core or a micro-controller, connected to the baseband processor and to an interface of the matching network, the controller configured to provide, responsive to the selected values from the baseband processor, one or more control signals for the one or more adjustable reactive network components via the interface so as to tune the one or more adjustable reactive network components accordingly. For example, in a practical transceiver realization a system designer may build a tunable lossless network to cover all frequencies involved, and the elements may have a range of tuning to cover the expected values where the transceiver is meant to be utilized or deployed. Therefore, tuning the network may be based on an (trained) iterative algorithms. The baseband processor may have previous knowledge of some or all responses of the network (response of each network configuration) that may be acquired by a calibration process, e.g., during production or by testing.

In accordance with embodiments the full-duplex transceiver apparatus comprises at least one further transmit front-end for feeding a further antenna, wherein the further antenna is connected to a further antenna port of the matching network, and wherein the further transmit front-end is connected to a further front-end port of the matching network.

In accordance with embodiments the full-duplex transceiver apparatus comprises at least one further receive front-end for receiving a remotely-generated signal from a further antenna, wherein the further antenna is connected to a further antenna port of the matching network, and wherein the further receive front-end is connected to a further front-end port of the matching network.

In accordance with embodiments the full-duplex transceiver apparatus comprises a second receive front-end for receiving a remotely-generated signal from the first antenna, and a non-reciprocal device having a first terminal connected to the first front-end port of the matching network, a second terminal connected to the first transmit front-end and a third terminal connected to the second receive front-end.

In accordance with embodiments the full-duplex transceiver apparatus comprises a second transmit front-end for feeding the second antenna, and a non-reciprocal device having a first terminal connected to the second front-end port of the matching network, a second terminal connected to the first receive front-end and a third terminal connected to the second transmit front-end.

In accordance with embodiments the full-duplex transceiver apparatus comprises a second receive front-end for receiving a remotely-generated signal from the first antenna, the second receive front-end connected to a further front-end port of the matching network, and a non-reciprocal device having a first terminal connected to the first antenna, a second terminal connected to the first antenna port of the matching network and a third terminal connected to a further antenna port of the matching network.

In accordance with embodiments the full-duplex transceiver apparatus comprises a second transmit front-end for feeding the second antenna, the second transmit front-end connected to a further front-end port of the matching network, and a non-reciprocal device having a first terminal connected to the second antenna, a second terminal connected to the second antenna port of the matching network and a third terminal connected to a further antenna port of the matching network.

In accordance with embodiments the full-duplex transceiver apparatus comprises a second receive front-end for receiving a remotely-generated signal from the first antenna, and a non-reciprocal device, wherein the matching network comprises a distributed network including a first network and a second network, the first network having a plurality of antenna ports and a plurality of output ports, the plurality of antenna ports including the first antenna port and the second antenna port, and the second network having a plurality of output ports and a plurality of front-end ports, the plurality of front-end ports including the first front-end port and the second front-end port, wherein the second receive front-end is connected to a further front-end port of the second network, and wherein the non-reciprocal device has a first terminal connected to an output port of the first network, a second terminal connected to a first input port of the second network and a third terminal connected to a second input port of the second network.

In accordance with embodiments the full-duplex transceiver apparatus comprises a second transmit front-end for feeding the second antenna, and a non-reciprocal device, wherein the matching network comprises a distributed network including a first network and a second network, the first network having a plurality of antenna ports and a plurality of output ports, the plurality of antenna ports including the first antenna port and the second antenna port, and the second network having a plurality of output ports and a plurality of front-end ports, the plurality of front-end ports including the first front-end port and the second front-end port, wherein the second transmit front-end is connected to a further front-end port of the second network, and wherein the non-reciprocal device has a first terminal connected to an output port of the first network, a second terminal connected to a first input port of the second network and a third terminal connected to a second input port of the second network. In accordance with examples, the non-reciprocal device may be passive, however, some research work shows non-reciprocity (anisotropic behavior) may be achieved via active methods so that the non-reciprocal device may also be an active device.

In accordance with embodiments the non-reciprocal device comprises a circulator.

In accordance with embodiments the plurality of antennas comprises one or more antenna arrays, the antenna array including a plurality of antenna elements.

In accordance with embodiments the full-duplex transceiver apparatus is configured to implement one or more additional self-interference cancellation approaches.

Figure 3:
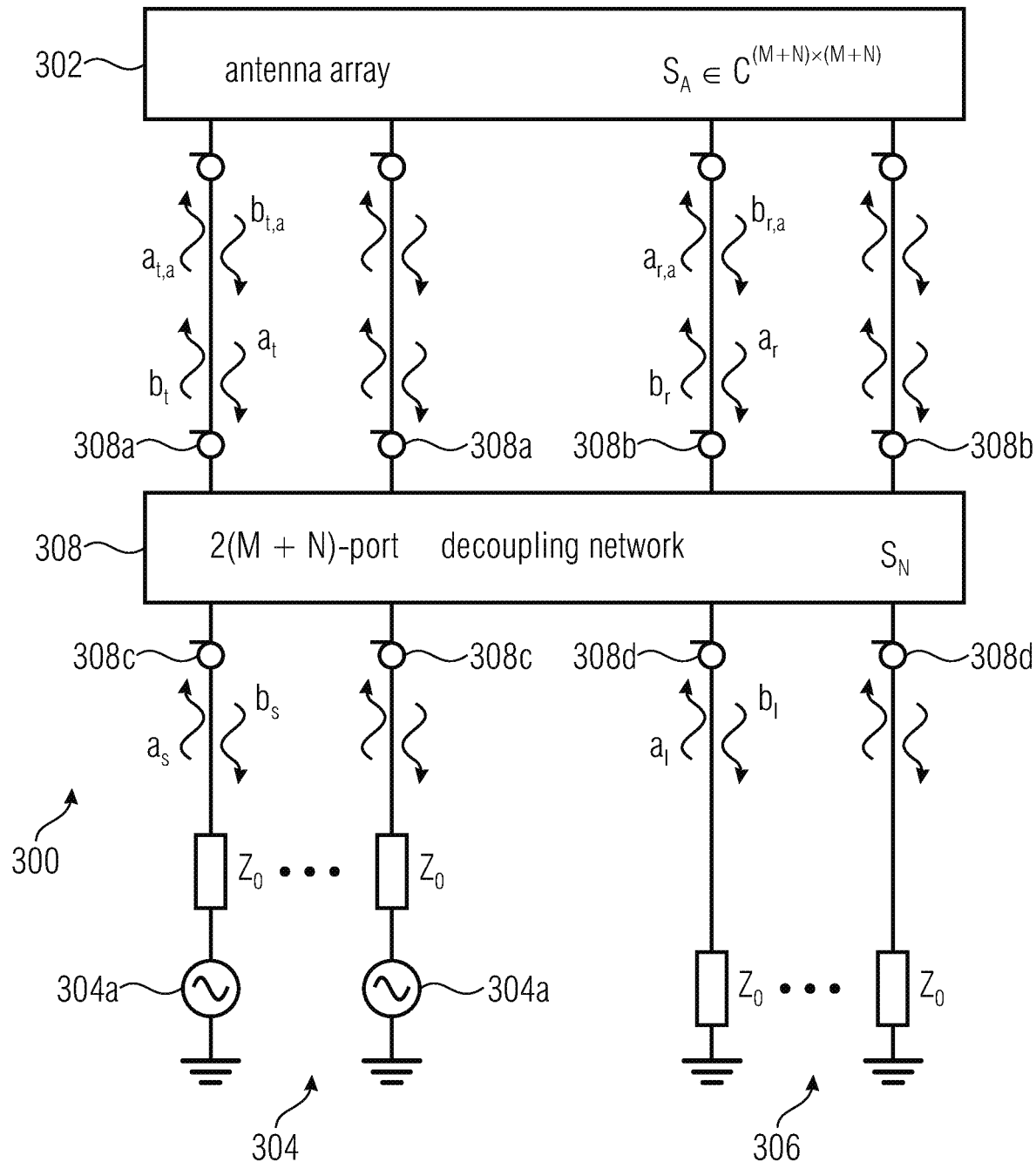
FIG. 3 is a block diagram illustrating a full-duplex transceiver apparatus in accordance with an embodiment of the present invention.

FIG. 3 is a block diagram illustrating a full-duplex transceiver apparatus in accordance with an embodiment of the present invention. The full-duplex transceiver apparatus 300 may be provided as part of one or more entities of a wireless communication network, like the wireless communication network of FIG. 1, e.g., it may be part of a base station or a user device. The full-duplex transceiver apparatus 300 includes an antenna array 302 having a plurality of transmit and receive antennas, a plurality of transmit front-ends or transmit chains 304 for feeding the transmit antennas and a plurality of receive front-ends or receive chains 306 for receiving a signal via the receive antennas in the antenna array 302. Part of the received signal at the receive antennas in the antenna array 302 is also referred to as a remotely-generated signal which is generated by a remote wireless transceiver apparatus, e.g., at a transmitter remotely located from the full-duplex transceiver apparatus 300. The transmitter remotely located from the full-duplex transceiver apparatus 300 may be any other entity of the wireless communication network with which the full-duplex transceiver apparatus 300 communicates, like a base station or a user device. The other entity may also include a full-duplex transceiver as described herein.

In accordance with embodiments, the transmit and receive antenna array elements of the antenna array 302 may be located relative to each in the full-duplex transceiver apparatus 300 such that a portion of a signal transmitted by a transmit antenna is coupled into a receive antenna in addition to the remotely-generated or receive signal, i.e., SI is caused by the transmit signal coupled directly into the receive antenna. Further, a portion of a signal transmitted by the transmit antenna may be scattered back towards the full-duplex transceiver apparatus 300, and the back scattered signal is coupled into the receive antenna, i.e., SI is caused by the backscatter channel signal. Thus, SI may be caused by the transmit signal coupled directly into the receive antenna and by the backscatter channel signal. In accordance with other embodiments, SI may be caused by only one of the transmit signal coupled directly into the receive antenna or by the backscatter channel signal. In either case, due to the SI the actual signal delivered to the receive chain 306 includes the SI signal which interferes with the remotely-generated or receive signal so that the actual receive signal may not be properly detected, e.g., in case the remotely-generated signal as received at the full-duplex transceiver apparatus 300 has a level substantially lower than the SI signal.

In accordance with the inventive approach, to address the self-interference phenomenon, a matching network 308 is coupled between the plurality of antennas of the antenna array 302 and the transmit and receive front-ends 304, 306 for feeding the transmit antennas from the transmit front-ends 304 and for delivering the signal from the receive antennas to the receive front-ends 306. The matching network 308 is a lossless reciprocal network causing a cancellation of self-interference at the receive antennas. The lossless reciprocal network 308 has first antenna ports 308a connected to the transmit antennas, second antenna ports 308b connected to the receive antennas, first front-end ports 308c connected to the transmit front-ends 304, and second front-end ports 308d connected the receive front-ends 308d.

The matching network 308, also referred to as decoupling network or lossless network, interconnects the transmit and receive front-ends 304, 306 of the wireless transceiver 300 to the dedicated transmit and receive antenna array elements of the antenna array 302. The inward and outward waves, both from a perspective of the decoupling network 308 and the antenna array 302, are shown in FIG. 3. Each of the transmit front-ends 304 is represented by a source 304a connected to ground and in series to a characteristic impedance $Z_0$, and each of the receive front-ends 306 is represented by a characteristic impedance load $Z_0$ connected to ground.

The lossless network 308 includes 2×(M+N) ports 308a-308d and is used to fed N transmit antenna array elements from the associated transmit chains 304, and to deliver a reception signal from M receive antenna array elements to the associated receive chains 306. The lossless network 308 manipulates the waves traveling through the lossless network 308 to provide for an optimized, bidirectional power delivery. FIG. 3 illustrates the forward traveling waves toward the lossless network 308, and the reverse traveling waves toward the transmit and receive chains 304, 306 and the antenna array elements. In FIG. 3 $\{a_s, b_s\} \in \mathbb{C}^{N \times 1}$, $\{a_l, b_l\} \in \mathbb{C}^{N \times 1}$, $\{a_t, b_t\} \in \mathbb{C}^{N \times 1}$ and $\{a_r, b_r\} \in \mathbb{C}^{N \times 1}$ are the forward and reverse traveling wave pairs representing respectively the interfaces to the transmit chains 304, the receive chains 306, the transmit antennas, and the receive antennas.

Although lossless networks are basically known (see references [41] and [42]), it has been found by the inventors of the present invention that such networks are suited to address the self-interference phenomenon encountered in a full-duplex transceiver apparatus experiencing a self-interference signal at the receive antenna. Such networks have been found to allow for the desired self-interference cancellation (SIC) while achieving the advantages described herein over conventional SIC approaches. An embodiment for realizing such a lossless network for self-interference cancellation in an agile full-duplex wireless transceiver is now be described. The embodiment is described with reference the SI caused by the direct coupling of the transmit signal into the receive antenna due to the physical proximity among the transmit and receive antennas, however, the same considerations apply for a self-interference that is caused by the backscatter channel. In the following description, boldface letters in their capital case X denote matrices, and denote vectors in their small case x. The superscripts $(\cdot)^T$ and $(\cdot)^H$ denote the transpose and hermitian (transpose conjugate) of a matrix, respectively. The term $x_{i,j}$ indicates the $ij^{th}$ element in a matrix X. Unless it is indicated otherwise, the letters a and b are used to denote the forward and reverse traveling waves, respectively. The symbol $Z_0$ represents the characteristic impedance.

Antenna Mutual Coupling

A network based analysis of the self-interference is now provided, and the analysis is carried out for a dedicated transmit and receive antenna configuration in a full-duplex MIMO transceiver.

Antenna Mutual Coupling Causing the Self-Interference

The presence of the receiving antennas close to the transmit antennas in a full-duplex transceiver causes that a portion of the transmit signal is coupled into the local receive antenna. This portion of the signal, which has been characterized so far in conventional duplexing system as coupling loss (see reference [42]), is equivalent to the self-interference in full-duplex transceivers.

Figure 4:
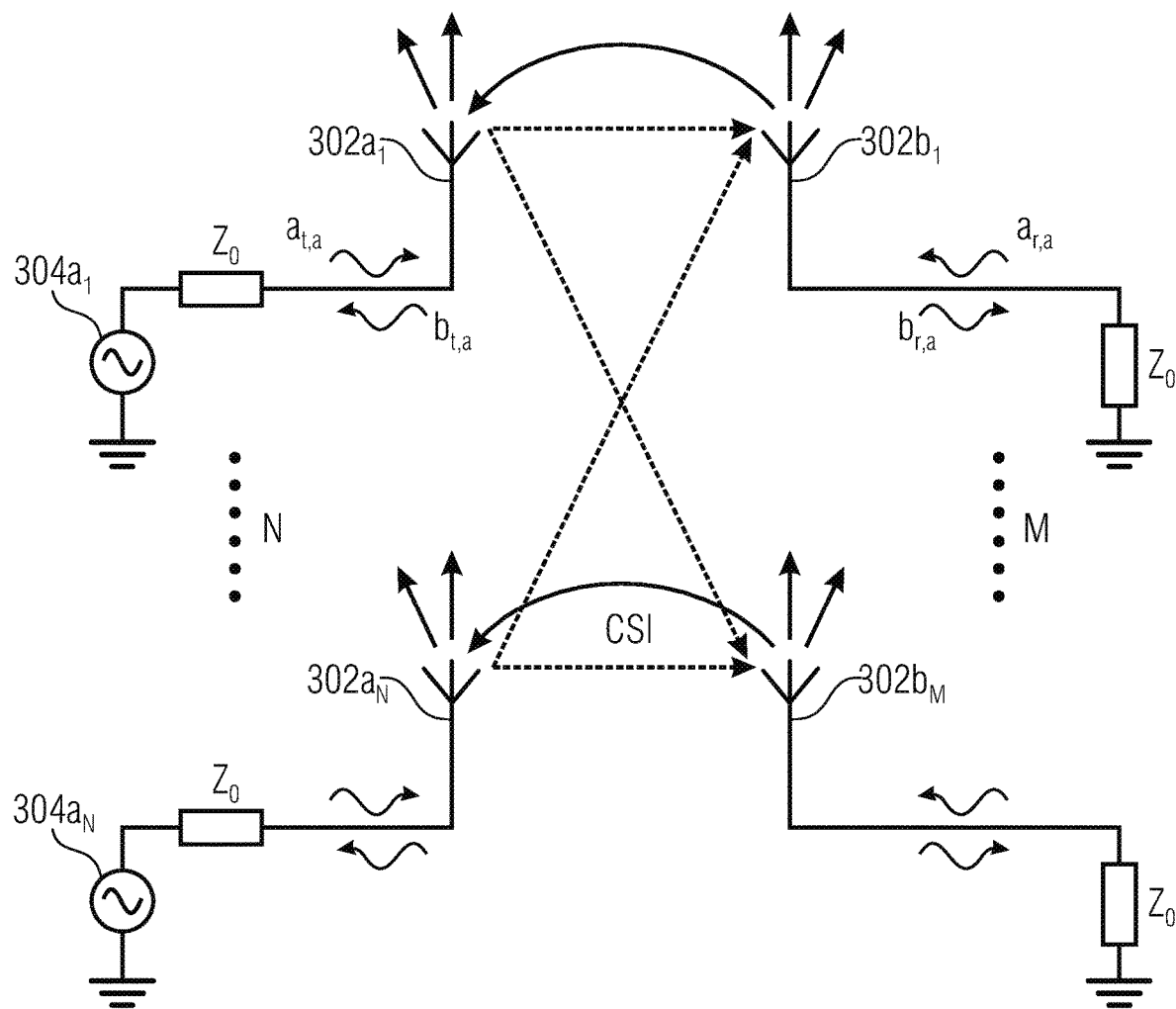
FIG. 4 illustrates the interaction among transmit antennas and receive antennas located in close proximity to each other.

FIG. 4 illustrates the interaction among N transmit antennas $302_{a1} \ldots 302_{aN}$ and M receive antennas $302_{b1} \ldots 302_{bM}$ located in close proximity to each other (see references [2], [42]-[44]). The M receive antennas $302_{b1} \ldots 302_{bM}$ are each connected to a characteristic impedance load $Z_0$, and the N transmit antennas $302_{a1} \ldots 302_{aN}$ are connected to respective signal sources $304_{a1} \ldots 304_{aN}$ having an internal impedance equal to the characteristic impedance $Z_0$. The forward or inward traveling wave $a_{t,a}$ of the transmit signal reaches an associated antenna element, and a part of the inward traveling wave $a_{t,a}$ excites the antenna to radiate, whereas another part of the inward traveling wave $a_{t,a}$ is reflected due to a mismatch between the transmit antenna impedance and the source impedance, thereby forming a reverse or outward traveling wave $b_{t,a}$. A part of the radiated signal couples directly into the adjacent antennas, thereby causing the self-interference phenomenon as it also couples into the receive antennas and contributes to the reverse or outward traveling wave $b_{r,a}$, in addition to the desired reception signal part due to the remotely-generated signal. Two signal components couple back into the transmit antennas to contribute to the outward traveling wave $b_{t,a}$: (1) The radiated waves from receive antennas due to the induced currents by neighboring transmit elements, and (2) the directly re-scattered transmit signals by the receive antennas. This energy interchanging among the antenna elements repeats infinitely (see reference [2]).

The scattering-parameters (S-parameter) matrix $S_A$ representing the interaction among the antenna array elements, which is comprised of the M receive antennas and the N transmit antennas, may be expressed as follows:

$$S_A = \begin{pmatrix} S_{A,T} & C_{SI}^T \\ C_{SI} & S_{A,R} \end{pmatrix},$$

where $S_A \in \mathbb{C}^{(M+N)\times(M+N)}$ is divided into four submatrices $S_{A,T} \in \mathbb{C}^{N\times N}$, which describes the interaction among the transmit antenna elements, $S_{A,R} \in \mathbb{C}^{M\times M}$, which describes the interaction among the receive antenna elements, and $C_{SI} \in \mathbb{C}^{M\times N}$, which is the self-interference representing sub-matrix. It is noted that the S-parameter matrix $S_A$ describes the interface of the antennas to the transceiver front-ends, and the mutual coupling among the antennas. It does not describe the radiative interface of the antennas.

The interaction among the antenna elements is reciprocal, thus, the sub-matrices and then the large matrix are symmetric: $S_{A,T}=S_{A,T}^T$, $S_{A,R}=S_{A,R}^T$, and $S_A=S_A^T$. The antenna elements are dissipating loads, therefore, the maximum eigenvalue is smaller than one ($\max(\lambda_{S_A})<1$). The relation between the forward and reverse traveling waves at the transmit and receive antennas may be expressed in matrix notations by:

$$\begin{pmatrix} b_{t,a} \\ b_{r,a} \end{pmatrix} = \begin{pmatrix} S_{A,T} & C_{SI}^T \\ C_{SI} & S_{A,R} \end{pmatrix} \begin{pmatrix} a_{t,a} \\ a_{r,a} \end{pmatrix},$$

where $a_{t,a}$, $b_{t,a} \in \mathbb{C}^{N\times 1}$ represent the inward and the reflected traveling waves at the transmitter, and $a_{r,a}$, $b_{r,a} \in \mathbb{C}^{M\times 1}$ represent the inward and the reflected traveling waves at the receiver.

Mutual Impedance Among Antenna Array Elements

The presence of neighboring antennas in physical proximity alters the input impedance of an antenna element. The input impedance is not the same as it is for an isolated element that radiates to an unbounded medium. The corresponding impedance of the coupling among the antenna array elements is a function of the inter-spacing (relative positioning) between the antennas and the antenna geometry as well (see references [2], [42]). These interactions may be fully characterized by the impedance matrix $Z_A \in \mathbb{C}^{(M+N)\times(M+N)}$, which may be calculated directly from the scattering matrix $S_A$ by means of Cayley's transformation (see references [41])

$$Z_A = Z_0(I+S_A)(I-S_A)^{-1},$$

where $I \in \mathbb{N}^{(M+N)\times(M+N)}$ is the identity matrix.

The self-interference describing part is represented by the submatrix $Z_{SI} \in \mathbb{C}^{M\times N}$, which may be extracted from the impedance large matrix as follows:

$$Z_A = \begin{pmatrix} Z_{A,T} & Z_{SI}^T \\ Z_{SI} & Z_{A,R} \end{pmatrix},$$

where $Z_{A,T} \in \mathbb{C}^{N\times N}$ and $Z_{A,R} \in \mathbb{C}^{M\times M}$ are the respective impedance matrices of the transmit and receive antenna elements, in which $z_{A,T(i,i)}=z_{A,R(i,i)}=Z_0$ for an isolated and perfectly matched antenna element. The impedance includes resistive parts $R_A$ and reactive parts $X_A$, so that $Z_A=R_A+jX_A$.

Lossless Network for Self-Interference Suppression

As has been found out by the inventors, the self-interference may be canceled or significantly reduced by utilizing, as described above, a lossless network that interconnects the wireless transceiver front-ends to the antenna array elements. Assuming a transceiver architecture as described above with reference to FIG. 3, the S-parameter matrix that describes the 2×(M+N) port network 308 and how this matrix dictates the relation among the inward and outward traveling waves at the network ports 308a-308d may be given by $$\begin{pmatrix} b_s \\ b_l \\ b_t \\ b_r \end{pmatrix} = \begin{pmatrix} S_{TT} & C_{RT} & L_{13} & X_{14} \\ C_{RT}^T & S_{RR} & X_{23} & L_{24} \\ L_{13}^T & X_{23}^T & S_T & C_C \\ X_{14}^T & L_{24}^T & C_C^T & S_R \end{pmatrix} \begin{pmatrix} a_s \\ a_l \\ a_t \\ a_r \end{pmatrix},$$

with $$S_N = \begin{pmatrix} s_{TT} & C_{RT} & L_{13} & X_{14} \\ C_{RT}^T & S_{RR} & X_{23} & L_{24} \\ L_{13}^T & X_{23}^T & X_T & C_C \\ X_{14}^T & L_{24}^T & C_C^T & S_R \end{pmatrix} \in \mathbb{C}^{2(M+N)\times 2(M+N)},$$

where $S_N$ is composed of a the following submatrices:
- $L_{13} \in \mathbb{C}^{N\times N}$ and $L_{24} \in \mathbb{C}^{M\times M}$ representing respectively the insertion-loss delivery to the transmit antennas and from the receive antennas.
- $X_{14} \in \mathbb{C}^{N\times M}$ and $X_{23} \in \mathbb{C}^{M\times N}$ representing the cross-talk between the transmit and receive paths.
- $\{S_{TT}, S_T\} \in \mathbb{C}^{N\times N}$ and $\{S_{RR}, S_R\} \varepsilon \mathbb{C}^{M\times M}$ are symmetric scattering matrices describing the four network interfaces to the transmit and receive chains, and antennas.
- $\{C_{RT}, C_C\} \in \mathbb{C}^{N\times M}$ representing the coupling interchange between the transmitter and receiver at the antenna and front-ends interfaces, respectively.

The decoupling network is lossless by design as it includes reactive components only, therefore, its specifying scattering matrix satisfies $S_N^H S_N = I_{(2M+2N)}$ and $\mathrm{tr}(\Lambda_{S_N})=1$, where $\Lambda_{S_N}$ is the eigenvalue matrix of $S_N$. Moreover, the network does not contain any element having an anisotropic property (see reference [42]), which makes it reciprocal, i.e., $S_N^T=S_N$ terms of the scattering matrix.

Self-Interference Cancellation Conditions

In order to cancel or reduce the self-interference, the outward traveling waves from the lossless network at the receiver are to be eliminated or reduced, $b_I=0$. The traveling waves term that represents the self-interference $b_I$ may be given by $$b_I = C_{SIC} a_s = C_{RT} a_s + S_{RR} a_I + X_{23} a_t + L_{24} a_r,$$

where $S_{RR} a_I=0$, when assuming matched receiver loads and no presence of the desired or actual receive signal, the remotely-generated signal.

To cancel or reduce the self-interference in a case of an arbitrary excitation for each of the transmitters, the following condition is to be fulfilled: $C_{SIC}=0$. The terms $a_t$ and $a_r$ in the above equation may be expressed by $$a_t = (B - \zeta A^{-1} \beta)^{-1} (\gamma + \zeta A^{-1} \alpha) a_s,$$

$$a_r = (A - \alpha B^{-1} \zeta)^{-1} (\alpha + \beta B^{-1} \gamma) a_s,$$

where $$A = I - C_{SI} C_C - S_{A,R} S_R,$$

$$B = I - C_{SI}^T C_C^T - S_{A,T} S_T,$$

and $$\alpha = C_{SI} L_{13}^T + S_{A,R} X_{14}^T \quad \beta = C_{SI} S_T^T + S_{A,R} C_C^T$$

$$\gamma = (X_{14} C_{SI})^T + S_{A,T} L_{13}^T \quad \zeta = C_{SI}^T S_R + S_{A,T} C_C.$$

$S_N \in \mathcal{S}$ is the satisfying condition to achieve maximum power delivery to the loads with no reflected signal (see references [41] and [45]), $$\mathcal{S} \triangleq \{S_N \in \mathbb{C}^{2(M+N) \times 2(M+N)}: S_M = S_A^H, S_N^T = S_N, S_N^H S_N = I\},$$

where $I \in \mathbb{N}^{2(M+N) \times 2(M+N)}$ is the identity matrix, and $$S_M = \begin{pmatrix} S_T & C_C \\ C_C^T & S_R \end{pmatrix}.$$

The aforementioned condition encompasses also that $A=0$ and $B=0$, thus, the satisfying condition of having the self-interference signal being cancelled is implicitly met.

Network Realization and Performance

As stated above, it has been found by the inventors of the present invention that an advantageous self-interference cancellation technique for a full-duplex transceiver may be based on a network composed of reactive elements that matches the driving impedance (see reference [43]) of the transmit and receive antennas, thereby decoupling the receiver from the transmitter. Advantageously, the network building blocks are reactive elements only, therefore, no or substantially no dissipation occurs within the network. Hence, unlike all conventional state-of-art SIC techniques, the inventive approach provides an RF-based solution which does not waste energy for the SIC.

As stated above, in order to cancel or reduce the self-interference, the condition $S_N \in \mathcal{S}$ needs to be satisfied, where $\mathcal{S}$ is the mathematical set defined above. The S-parameter matrix $S_N$ of the lossless network may be computed relying on known or measured antenna scattering parameters $S_A$ according to the following (see reference [41]):

$$\begin{pmatrix} S_{TT} & C_{RT} \\ C_{RR}^T & S_{RR} \end{pmatrix} = -V_{S_A} V_{S_A}^H U_{S_A}^* \Lambda_{S_A} V_{S_A}^T,$$

-continued $$\begin{pmatrix} L_{13} & X_{14} \\ X_{23} & L_{24} \end{pmatrix} = V_{S_A} (I - \Lambda_{S_A}^2)^{\frac{1}{2}} U_{S_A}^H,$$

$$S_M = V_{S_A} \Lambda_{S_A} U_{S_A}^H,$$

where $U_{S_A} \Lambda_{S_A} V_{S_A}^T$ is the result of a singular value decomposition (SVD) of the matrix $S_A$. The admittance matrix of the lossless network $Y_N \in \mathbb{C}^{2(M+N) \times 2(M+N)}$ may be computed based on the calculated S-parameter matrix. Similarly, as for the impedance matrix case, the Cayley's transformation may be invoked to compute the admittance from a known scattering:

$$Y_N = \frac{1}{Z_0} (I - S_N)(I + S_N)^{-1},$$

where $I \in \mathbb{N}^{2(M+N) \times 2(M+N)}$ is the identity matrix.

Dedicated Transmit and Receive Antennas

In accordance with embodiments, the full-duplex transceiver apparatus may include dedicated antennas for the transmission and the reception. Each of the transceiver front-ends—encompassing the transmitters and receivers—is connected to a dedicated antenna. The transceiver may also adopt a SISO (single-input-single-output), SIMO (single-input-multiple-output), MISO (multiple-input-single-output) or MIMO (multiple-input-multiple-output) antenna configuration/front-end count.

Lossless SIC Network for a SISO Antenna Configuration

Figure 5:
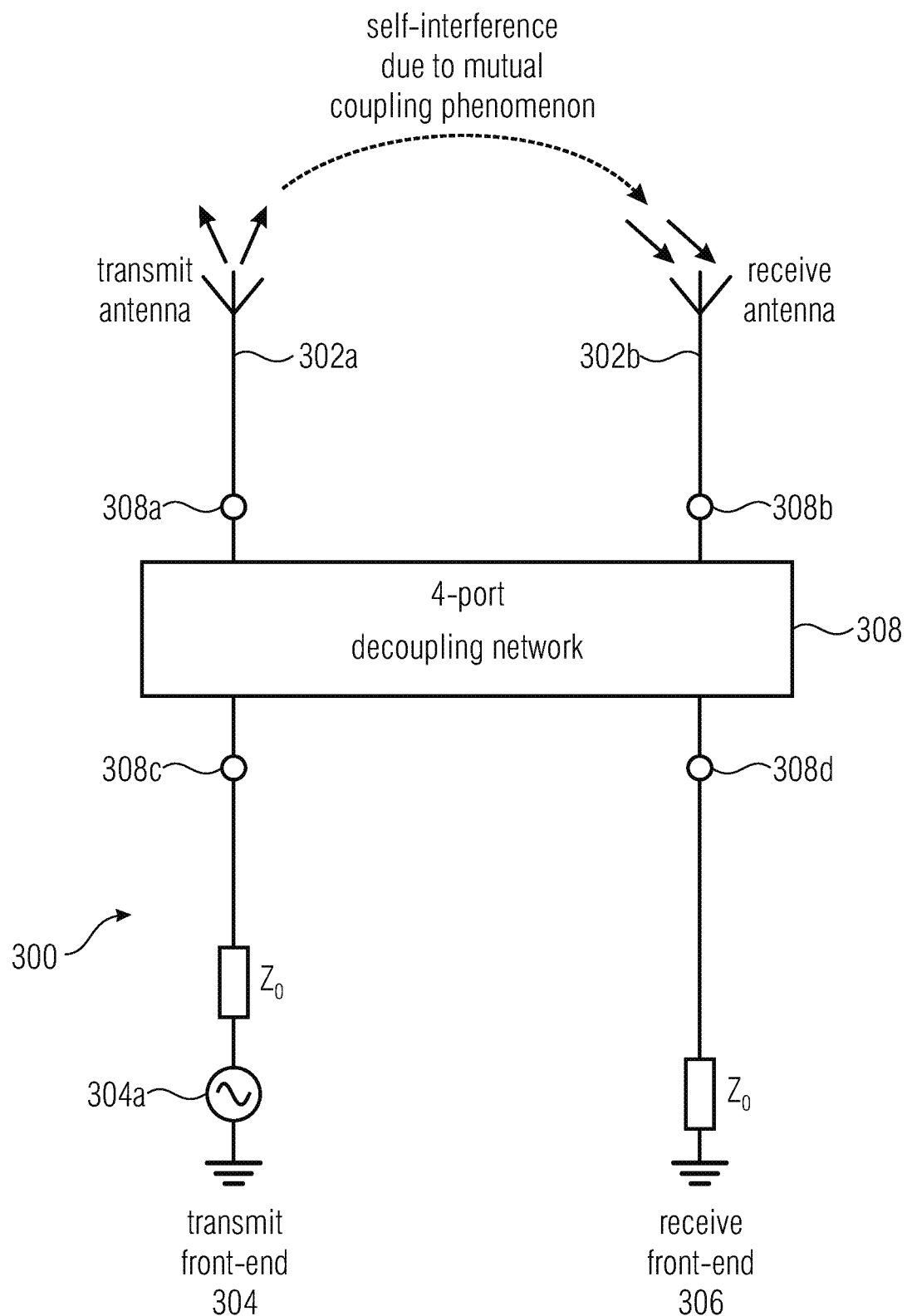
FIG. 5 illustrates a SISO transceiver configuration in accordance with an embodiment of the present invention using a lossless self-interference cancellation network.

FIG. 5 illustrates a SISO transceiver configuration in accordance with an embodiment of the present invention using the lossless self-interference cancellation network. The full-duplex transceiver apparatus 300 includes a dedicated transmit antenna 302a, a dedicated receive antenna 302b, a transmit front-end 304 for feeding the transmit antenna 302a, and a receive front-end 306. To address the self-interference phenomenon, the matching network 308 is coupled between the antennas 302a, 302b and the transmit and receive front-ends 304, 306. The lossless reciprocal network 308 is a 4-port network having a first or transmit antenna port 308a connected to the transmit antenna 302a, a second or receive antenna port 308b connected to the receive antenna 302b, a first or transmit front-end port 308c connected to the transmit front-end 304, and a second or receive front-end port 308d connected the receive front-end 308d so that the lossless network 308 interconnects the transceiver's front-ends 304, 306 to the antennas 302a, 302b. The SISO configuration may be referred to as a basic setup in which two antennas, one to transmit and the other one to receive, are connected to the transmit and receive front-ends, respectively, via the network 308.

Figure 6:
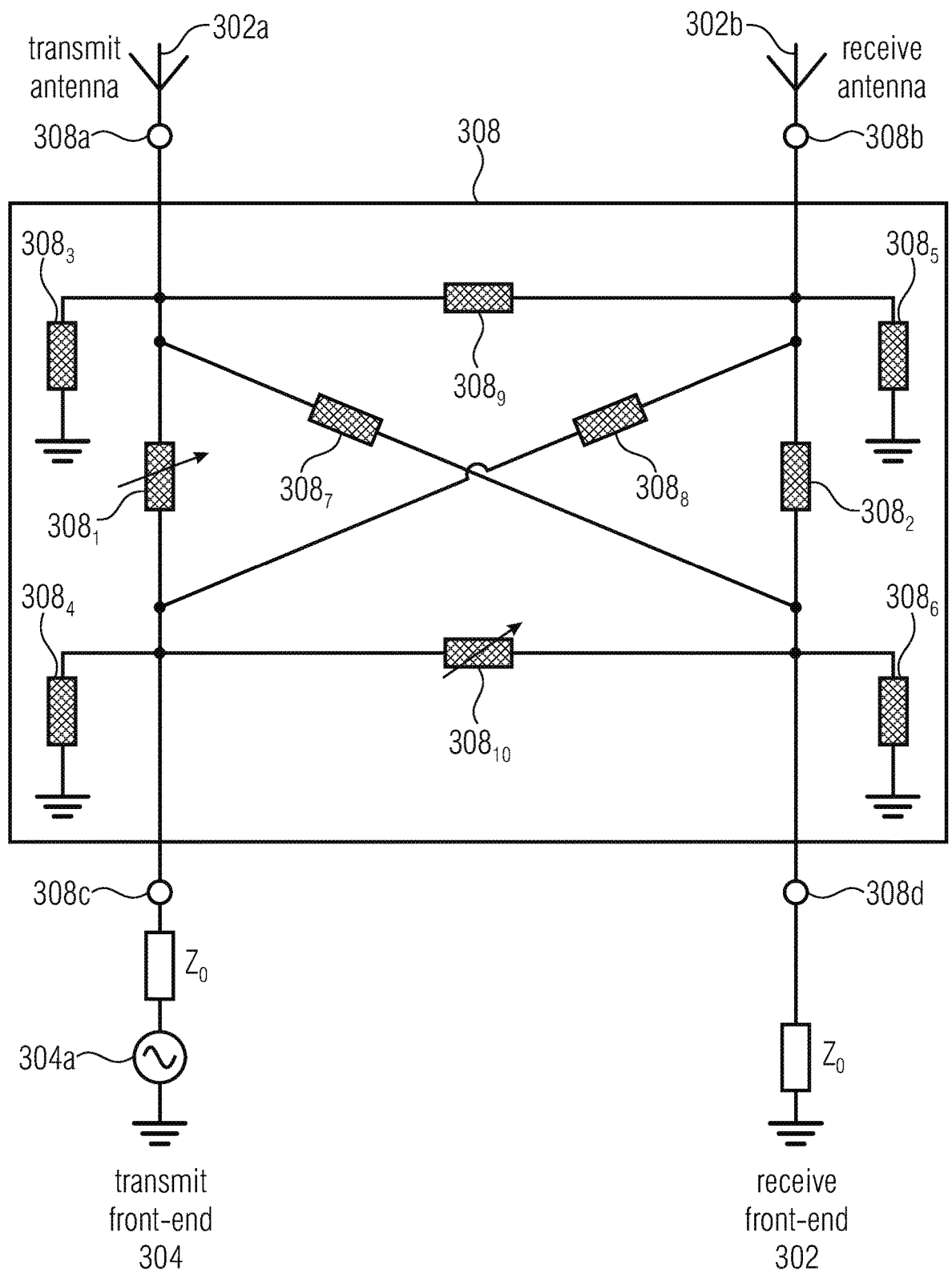
FIG. 6 shows an embodiment of a full constellation network of reactive components for implementing the lossless self-interference cancellation network in the SISO transceiver configuration of FIG. 5.

The components of the lossless network 308 may be chosen based on a calculation (see above) to decouple the receive antenna from the transmit antenna, thereby suppressing or reducing the self-interference at the local receiver. The lossless network 308 may be realized using reactive components $308_1$ to $308_{10}$, such as capacitors and coils. FIG. 6 shows an embodiment of a full constellation network 308 of reactive components for the SISO transceiver configuration of FIG. 5. The lossless network 308 for the SISO transceiver configuration is a full constellation network with a reactive component at each connection.

In accordance with embodiments, the lossless network may include one or more tunable elements, as is indicated in FIG. 6 by elements $308_1$ and $308_{10}$. Some or all of the elements $308_1$ to $308_{10}$, which construct the lossless network, may by tunable. For example, reactive components may be the construction blocks of the lossless network. These reactive elements may be realized by means of capacitors, coils or striplines, like microstrip lines. The tunability provides the wireless transceiver with the functionality of cancelling or reducing the self-interference over a wide range of frequencies or frequency bands. In other words, assuming that the wireless transceiver supports a range or a set of frequencies or frequency bands for operation—such as in SDR (Software Defined Radio) platforms, the lossless network components may be adjusted to match the selected frequency band for self-interference cancellation. The reactive elements may be tuned via an interface controlled by a DSP core or a micro-controller. The values of the reactive components may be estimated by a baseband processor to be used then for tuning the elements accordingly. Besides tuning the transceiver to a desired frequency, the tunability may provide the wireless transceiver with the functionality of compensating tolerances of the reactive components.

In accordance with other embodiments, the lossless network includes only fixed, non-tunable elements. For example, when considering FIG. 6 in which also elements $308_1$ and $308_{10}$ are non-tunable, a full-constellation network topology is provided which is capable of cancelling the self-interference at one chosen frequency. However, different topologies that treat multiple frequencies or/and a subset (reduced number of reactive elements) may be considered as a possible realization of the lossless network.

Lossless SIC Network for MIMO Antenna Configuration

Similar to the SISO case described above with reference to FIG. 5 and FIG. 6, the inventive approach, in accordance with other embodiments, may provide the lossless network for a MIMO configuration, which encompasses also the SIMO and MISO configurations as subsets.

Figure 7:
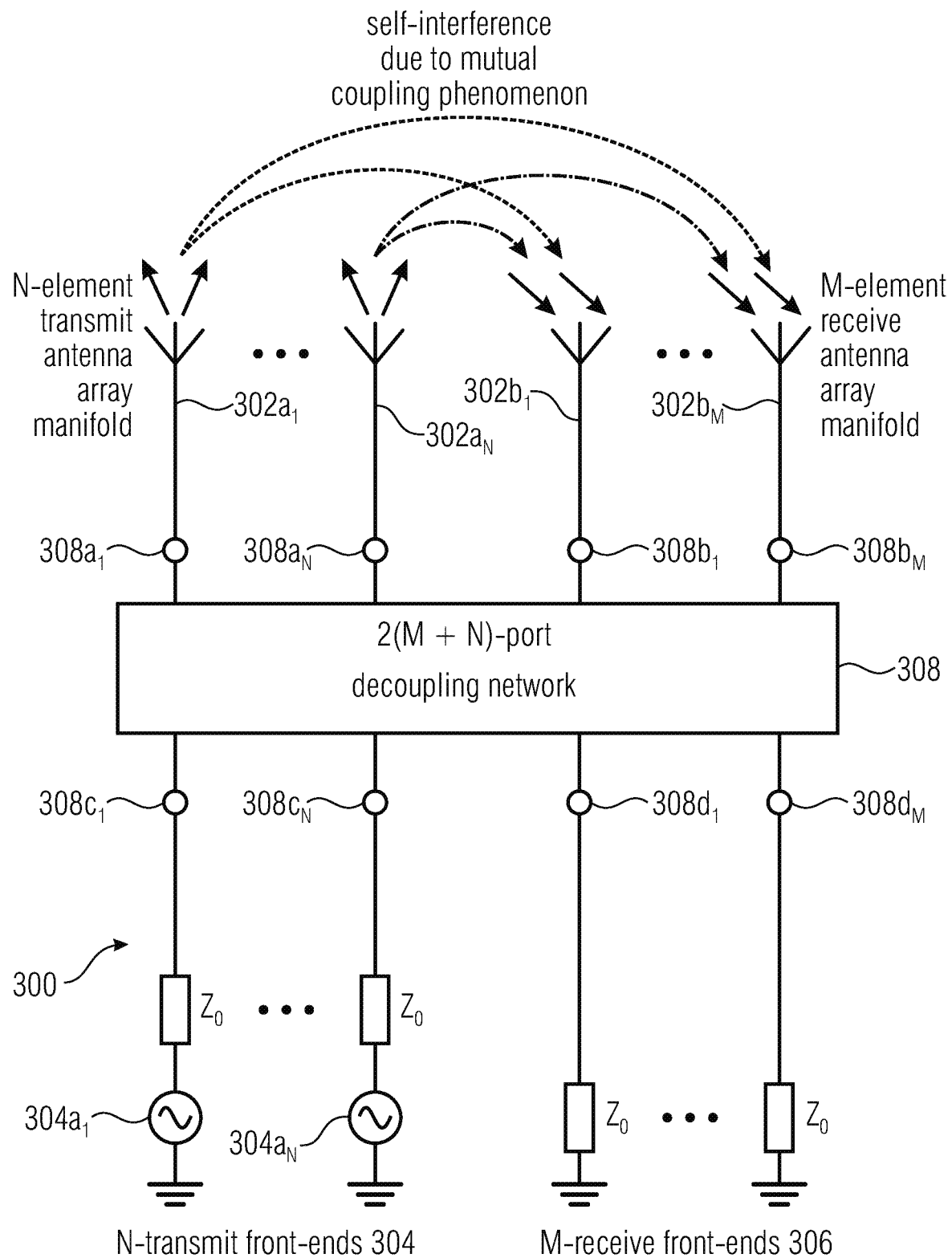
FIG. 7 illustrates a MIMO transceiver configuration in accordance with an embodiment of the present invention using a lossless self-interference cancellation network.

FIG. 7 illustrates a MIMO transceiver configuration in accordance with an embodiment of the present invention using the lossless self-interference cancellation network. The full-duplex transceiver apparatus 300 includes N transmit antennas $302_{a1} \ldots 302_{aN}$ and M receive antennas $302_{b1} \ldots 302_{bM}$ located in close proximity to each other. The transmit antennas may comprise a N-element transmit antenna array manifold, and the receive antennas may comprise a M-element receive antenna array manifold. By means of the lossless self-interference cancellation network 308 the M receive antennas $302_{b1} \ldots 302_{bM}$ are each connected to a characteristic impedance load $Z_0$, and the N transmit antennas $302_{a1} \ldots 302_{aN}$ are connected to respective sources $304_{a1} \ldots 304_{aN}$ having an internal impedance equal to the characteristic impedance $Z_0$. The lossless network 308 includes 2×(M+N) ports $308a_1$-$308d_M$ and is used to fed the N transmit antenna array elements from the associated transmit chains 304, and to deliver a reception signal from the M receive antenna array elements to the associated receive chains 306. As shown is FIG. 7, the lossless network 308 interconnects N transmit and M receive front-ends to at least N+M antennas. The lossless network is tuned to suppress or reduce the self-interference at the receivers by decoupling the antenna receive elements from the transmit antenna receive elements.

Shared Transmit and Receive Antennas

In accordance with other embodiments, the full-duplex transceiver apparatus may include shared antennas for the transmission and the reception. A shared antenna for each transmit and receive front-end pair may be realized via a 3-port circulator connectivity. This reduces the number of the antennas that may be used to half (in a symmetric transmitter and receiver constellation in a wireless transceiver) as each transmit-and-receive pair share the same antenna.

Figure 8:
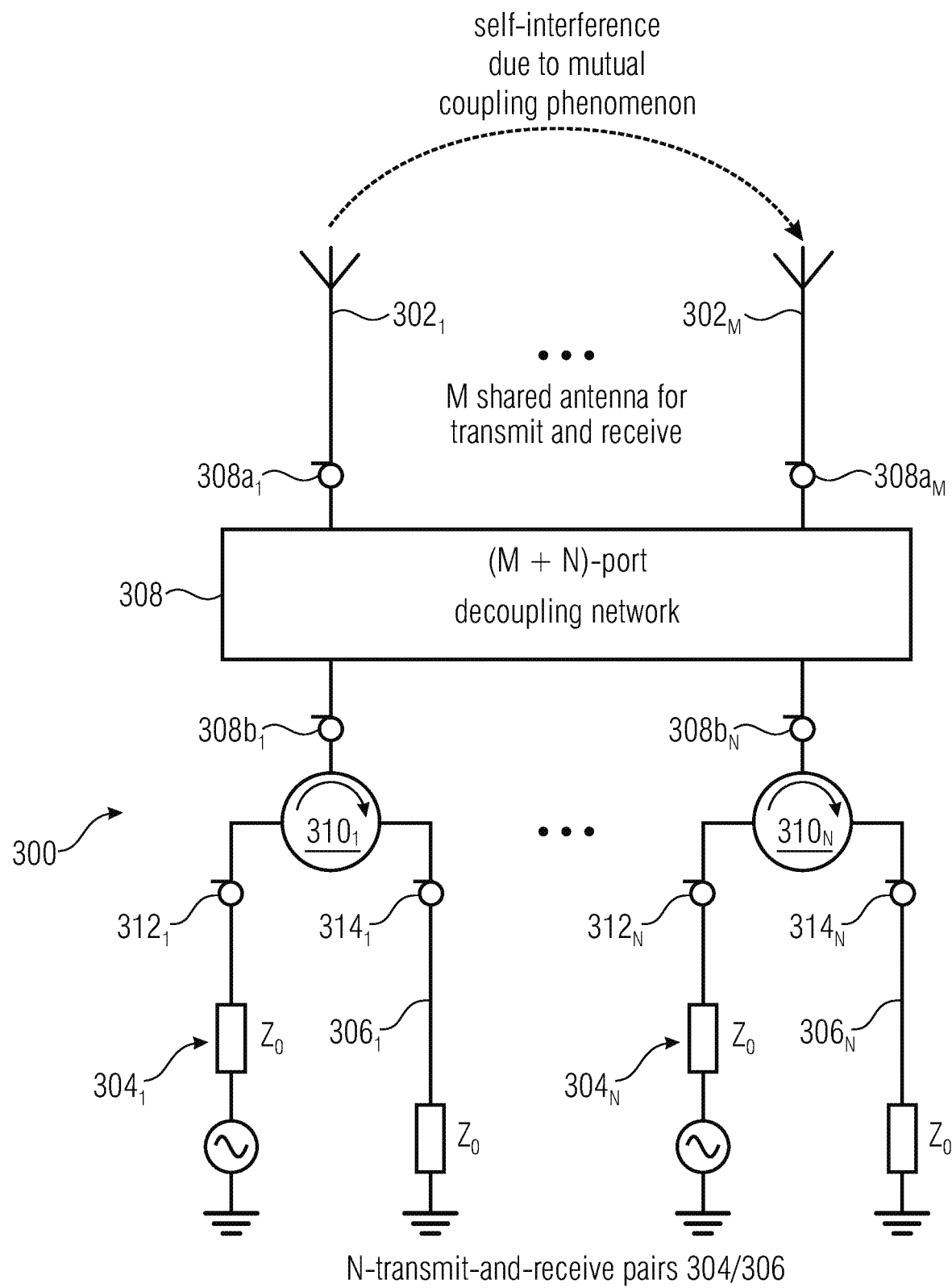
FIG. 8 shows an embodiment of a MIMO full-duplex transceiver apparatus including shared antennas for the transmission and the reception employing circulator connectivity and including a lossless network to cancel the inter antenna self-interference.

FIG. 8 shows an embodiment of a MIMO full-duplex transceiver apparatus including shared antennas for the transmission and the reception employing circulator connectivity and including a lossless network to cancel the inter antenna self-interference. The full-duplex transceiver apparatus 300 includes M shared antennas $302_1 \ldots 302_M$. By means of the lossless self-interference cancellation network 308 the M shared antennas $302_1 \ldots 302_M$ are connected to N transmit-and-receive front-end pairs 304/306 including respective transmit branches $304_1 \ldots 304_N$ and respective receive branches $306_1 \ldots 306_N$. The lossless network 308 includes (M+N) ports $308a_1$-$308a_M$, $308b_1$-$308b_N$ used to fed an antenna acting as transmit antenna, and to deliver a reception signal from an antenna acting as a receive antenna to the associated receive branch. For sharing the antennas for the transmission and the reception, the full-duplex transceiver apparatus 300 further includes respective circulators $310_1 \ldots 310_N$ connected between the lossless network 308 and the N transmit-and-receive front-end pairs 304/306. More specifically, a first terminal of the respective circulators $310_1 \ldots 310_N$ is connected to the respective network ports $308b_1$-$308b_N$, a second terminal $312_1 \ldots 312_N$ of the respective circulators is connected to the respective transmit branches $304_1 \ldots 304_N$ of the transmit-and-receive front-end pairs 304/306, and a third terminal $314_1 \ldots 314_N$ of the respective circulators is connected to the respective receive branches $306_1 \ldots 306_N$ of the transmit-and-receive front-end pairs 304/306.

The network 308 cancels or reduces the inter-antennas self-interference caused due to the coupling among the antennas, matches the antenna input impedance, ($S_{11}$), to the circulator output impedance and thus suppresses at least partially the self-interference caused by the transmitter at its receiver pair, and improves the power delivery from/to the antennas to/from transceiver front-ends due to its the impedance matching property.

Figure 9:
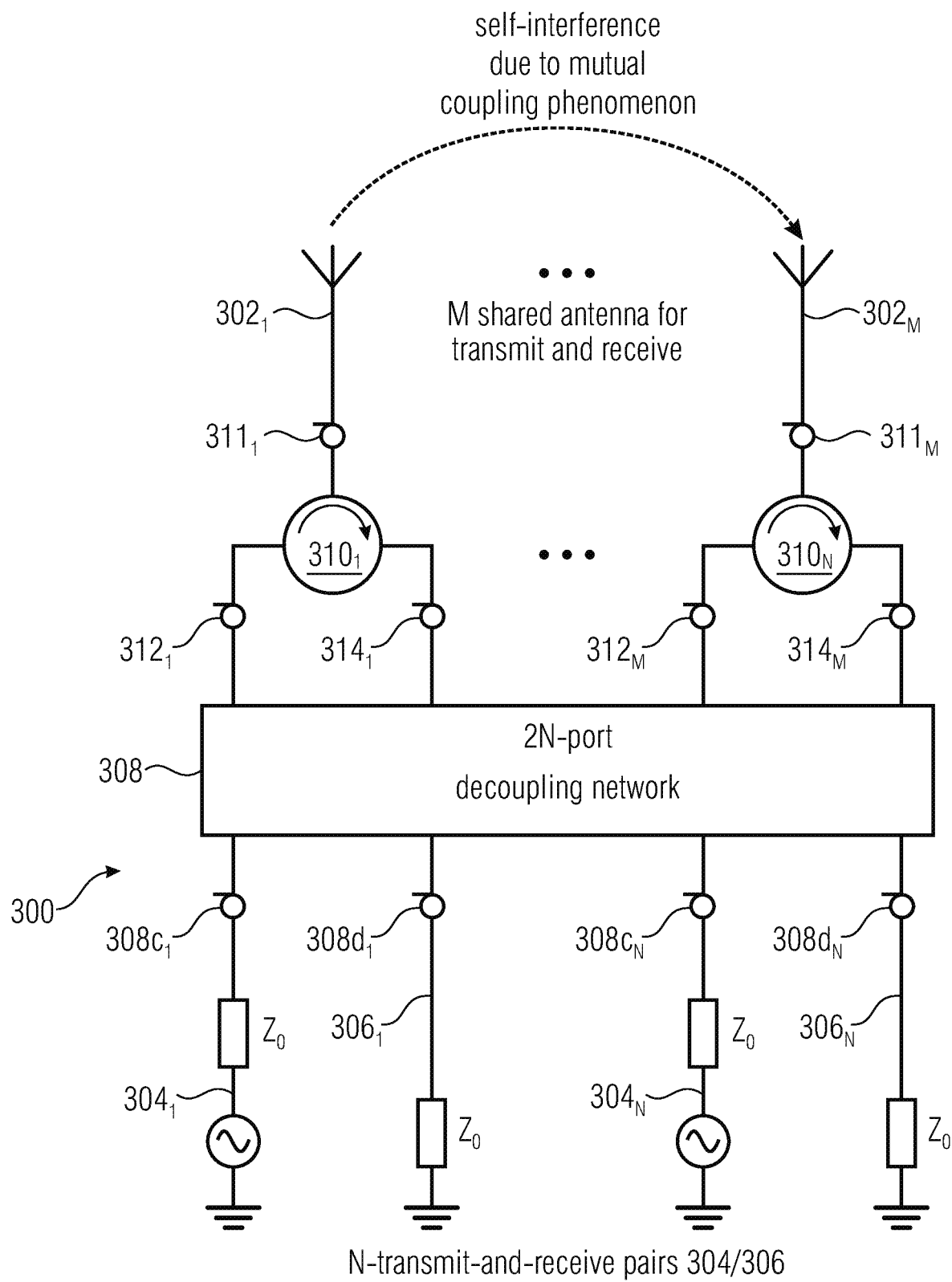
FIG. 9 shows another embodiment of a MIMO full-duplex transceiver apparatus including shared antennas for the transmission and the reception employing circulator connectivity and including a lossless network to cancel the inter antenna self-interference and the inter-front-end self-interference.

FIG. 9 shows another embodiment of a MIMO full-duplex transceiver apparatus including shared antennas for the transmission and the reception employing circulator connectivity and including a lossless network to cancel the inter antenna self-interference and the inter-front-end self-interference. The embodiment of FIG. 9 is similar to the one of FIG. 8 in that the full-duplex transceiver apparatus 300 also includes M shared antennas $302_1 \ldots 302_M$ connected, via the lossless self-interference cancellation network 308, to N transmit-and-receive front-end pairs 304/306 including respective transmit branches $304_1 \ldots 304_N$ and respective receive branches $306_1 \ldots 306_N$. Other than in the embodiment of FIG. 8 the lossless network 308 includes 2N ports used to fed an antenna acting as transmit antenna, and to deliver a reception signal from an antenna acting as a receive antenna to the associated receive branch, and for sharing the antennas for the transmission and the reception, the respective circulators $310_1 \ldots 310_M$ are connected between the antennas $302_1 \ldots 302_M$ and the lossless network 308. More specifically, a first terminal $311_1 \ldots 311_M$ of the respective circulators $310_1 \ldots 310_M$ is connected to the respective antennas $302_1 \ldots 302_M$, a second terminal $312_1 \ldots 312_M$ of the respective circulators is connected via the lossless network 308 to the respective transmit branches $304_1 \ldots 304_N$ of the transmit-and-receive front-end pairs 304/306, and a third terminal $314_1 \ldots 314_M$ of the respective circulators is connected via the lossless network 308 to the respective receive branches $306_1 \ldots 306_N$ of the transmit-and-receive front-end pairs 304/306.

Thus, in the embodiment of FIG. 9 the network interconnects the front-ends and the circulators terminals or inputs. In addition to the function offered by the embodiment of FIG. 8, this embodiment is used to cancel or reduce the interference that is caused by the imperfect circulator isolation. For the lossless network construction, a different topology, a different structure and different building components may be considered when compared to the embodiment of FIG. 8, because the circulator, also referred to as an anisotropic element or non-reciprocal device, is contributing to the self-interference phenomenon. i.e., it may also be a cause for self-interference.

Figure 10:
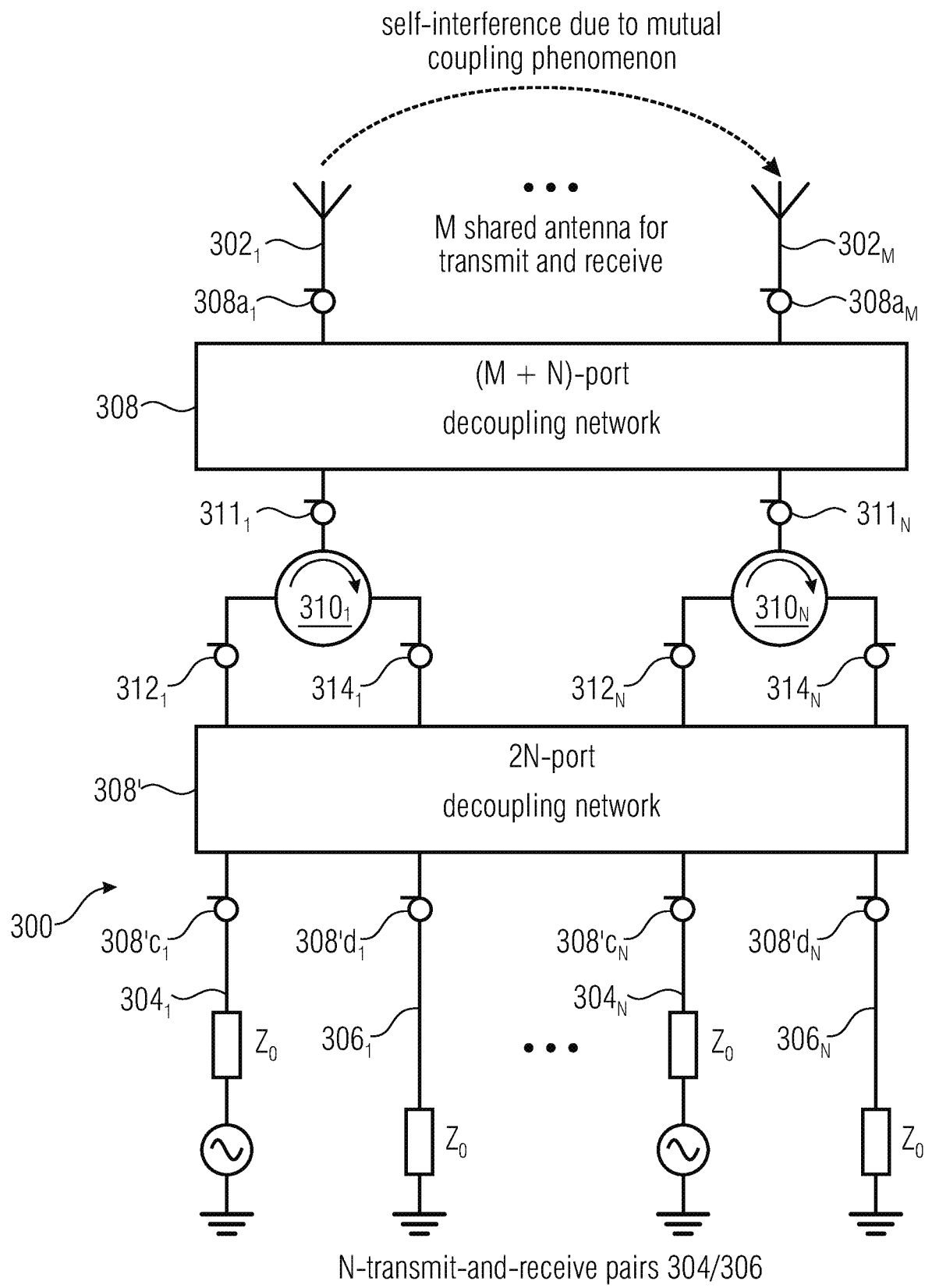
FIG. 10 shows yet another embodiment of a MIMO full-duplex transceiver apparatus including shared antennas for the transmission and the reception employing circulator connectivity and including a distributed lossless network to cancel the inter antenna self-interference and the inter-transmit-and-receive associated pair self-interference.

FIG. 10 shows yet another embodiment of a MIMO full-duplex transceiver apparatus including shared antennas for the transmission and the reception employing circulator connectivity and including a distributed lossless network to cancel the inter antenna self-interference and the inter-front-end self-interference. The embodiment of FIG. 10 is similar to the embodiments of FIG. 8 and FIG. 9 in that the full-duplex transceiver apparatus 300 includes M shared antennas $302_1 \ldots 302_M$ and N transmit-and-receive front-end pairs 304/306 including respective transmit branches $304_1 \ldots 304_N$ and respective receive branches $306_1 \ldots 306_N$. Other than in the embodiment of FIG. 8 and in FIG. 9 the M shared antennas $302_1 \ldots 302_M$ are connected to the N transmit-and-receive front-end pairs 304/306 via a distributed lossless network including a first lossless network 308 and a second lossless network 308'. The first lossless network 308 includes (M+N) ports $308a_1$-$308 a_M$ and $311_1$-$311_N$ used to fed an antenna acting as transmit antenna, and to deliver a reception signal from an antenna acting as a receive antenna. The second lossless network 308' includes 2N ports $312_1$-$312_N$, $314_1$-$314_N$, $308'c_N \ldots 308'c_N$ and $308'd_1 \ldots 308'd_N$ used to fed an antenna acting as transmit antenna, and to deliver a reception signal from an antenna acting as a receive antenna. For sharing the antennas for the transmission and the reception, the respective circulators $310_1 \ldots 310_N$ are connected between the first and second lossless networks 308, 308'. More specifically, a first terminal $311_1 \ldots 311_N$ of the respective circulators $310_1 \ldots 310_N$ is connected via the first lossless network to the respective antennas, a second terminal $312_1 \ldots 312_N$ of the respective circulators is connected via the second lossless network 308' to the respective transmit branches $304_1 \ldots 304_N$ of the transmit-and-receive front-end pairs 304/306, and a third terminal $314_1 \ldots 314_N$ of the respective circulators is connected via the second lossless network 308' to the respective receive branches $306_1 \ldots 306_N$ of the transmit-and-receive front-end pairs 304/306.

In the embodiment of FIG. 10, the upper part of the configuration including the antennas 302, the first network 308 and the circulators 310 has a similar function as in the embodiment described with reference to FIG. 8. The lower part of the configuration including the circulators 310, the second network 308' and the transmit-and-receive front-end pairs 304/306 provides for reducing or canceling the interference that is usually caused by an imperfect circulator isolation. For the second or lower part of the lossless network 308', similar design aspects as described above with reference to FIG. 9 may be considered to address the direct involvement (contribution to the self-interference) of the anisotropic element.

Figure 11:
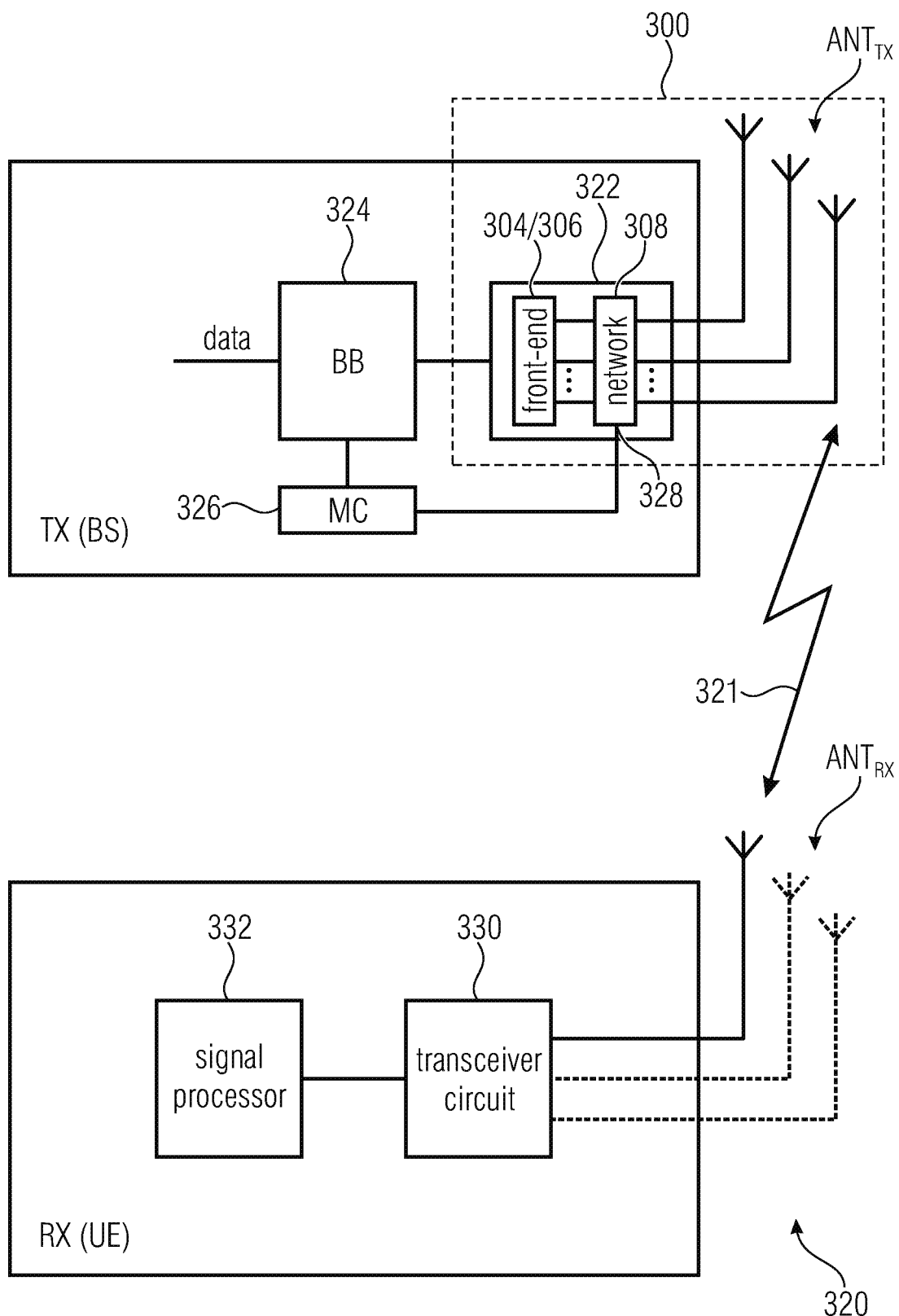
FIG. 11 is a schematic representation of a wireless communication system for communicating information between a transmitter TX, which includes a full-duplex transceiver apparatus in accordance with the present invention, and a receiver RX.

Embodiments of the present invention may be implemented in a wireless communication system as depicted in FIG. 1 including base stations and users, like mobile terminals or IoT devices. FIG. 11 is a schematic representation of a wireless communication system 320 for communicating information between a transmitter TX and a receiver RX. As is indicated by the arrow 321 signals are communicated between the transmitter TX and the receiver RX via a wireless communication link, like a radio link.

The transmitter TX includes a full-duplex transceiver apparatus 300 in accordance with the present invention. The full-duplex transceiver apparatus 300 includes the plurality of antennas $ANT_{TX}$ or an antenna array having a plurality of antenna elements. The plurality of antennas $ANT_{TX}$ include a first antenna and a second antenna. A transceiver circuit 322 includes the first transmit front-end 304 for feeding the first antenna, the first receive front-end 306 for receiving a remotely-generated signal via the second antenna, and the matching network 308, which is coupled between the plurality of antennas $ANT_{TX}$ and the transmit and receive front-ends 304/306 for feeding the first antenna from the first transmit front-end and for delivering the remotely-generated or received signal from the second antenna to the first receive front-end. The matching network 308 is the lossless reciprocal network causing a cancellation of the self-interference as described in detail in the embodiments above. In accordance with embodiments, the transmitter TX or the transceiver apparatus 300 further includes a baseband processor 324 receiving/outputting data received/to be transmitted, and a controller 326, like a DSP core or a microcontroller, connected to the baseband processor 324 and to an interface 328 of the matching network 308. In accordance with embodiments, the baseband processor 324 selects values for the one or more adjustable reactive network components for compensating the tolerances of the reactive network components and/or for matching the frequency or multiple frequencies to be used. The controller 326 provides, responsive to the selected values from the baseband processor 324, one or more control signals for the one or more adjustable reactive network components via the interface 328 so as to tune the one or more adjustable reactive network components accordingly.

The receiver RX includes at least one antenna $ANT_{RX}$. In other embodiments, the receiver RX may include more than one antenna. The receiver RX further includes a transceiver circuit 330 and a signal processing unit 332 for processing data received/to be transmitted.

In accordance with other embodiments, also the receiver RX may include a full-duplex transceiver apparatus 300 in accordance with the present invention. In yet other embodiments, instead of the transmitter TX only the receiver TX may include the full-duplex transceiver apparatus 300 in accordance with the present invention.

In accordance with embodiments the inventive lossless-network-based self-interference cancellation approach may be combined with other SIC approaches or techniques, e.g., one or more of the conventional SIC approaches discussed at the beginning. For example, the inventive lossless-network-based self-interference cancellation approach may be combined with a digital SIC to cancels or reduce a residual self-interference in the digital baseband (SI applied to the digital I/Q samples at the receiver). In other words, embodiments provide a transceiver realization where the inventive approach for SIC is concatenated with one or more other SIC approaches, e.g., digital self-interference cancellation, in order to further improve SIC, e.g., to achieve a desired amount (level) of self-interference suppression. The inventive approach may be combined with any other SIC approach.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 12:
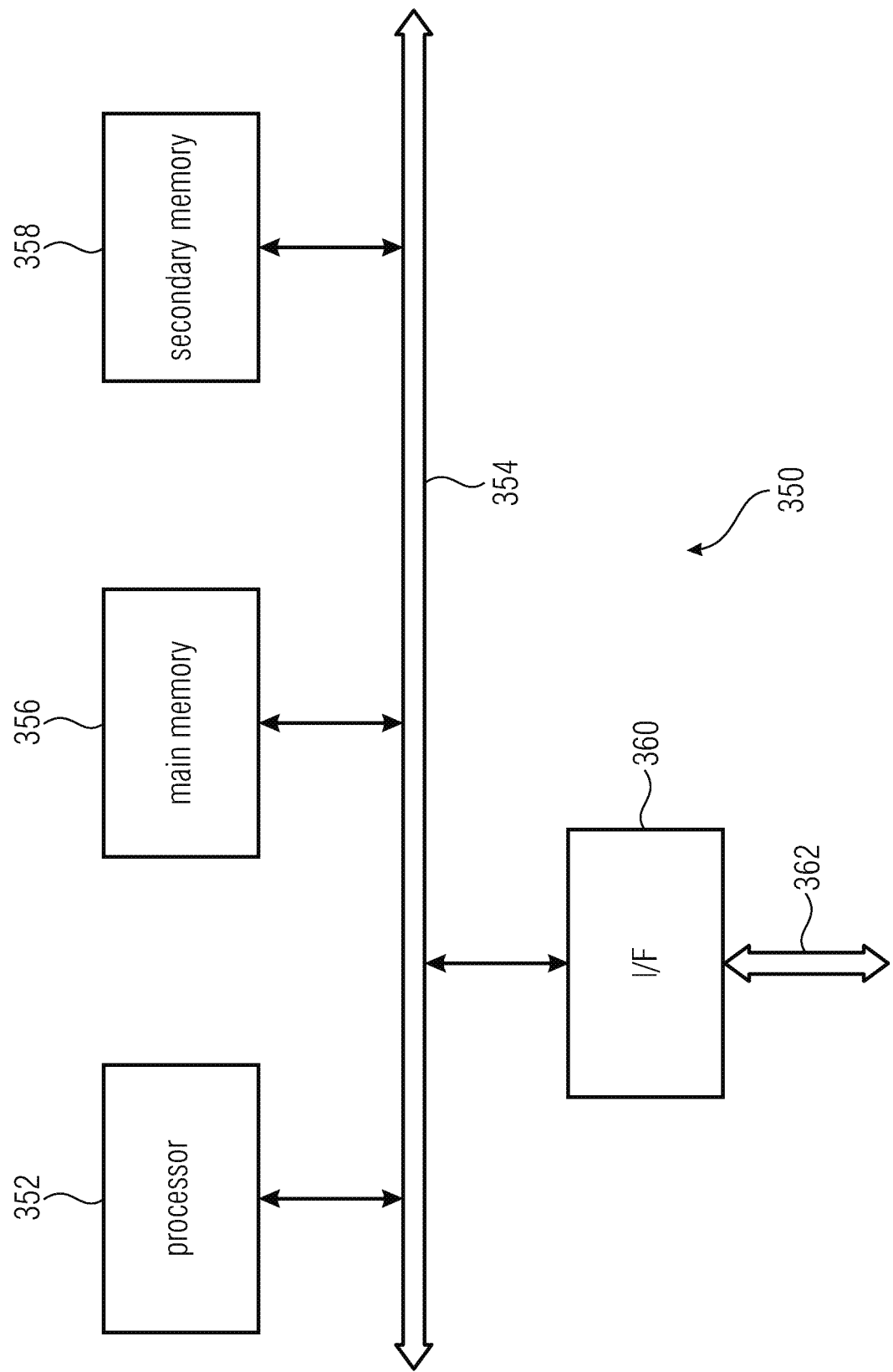
FIG. 12 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the form electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enable the computer system 350 to implement the present invention. In particular, the computer program, when executed, enable processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] R. Askar, B. Schubert, W. Keusgen, and T. Haustein, "Agile Full-Duplex transceiver: The concept and Self-Interference channel characteristics," in *European Wireless* 2016; 22th *European Wireless Conference,* 2016.

[2] B. L. Allen, J. L.; Diamond, "Mutual coupling in array antennas," MASSACHUSETTS INST OF TECH LEXINGTON LINCOLN LAB, Tech. Rep., 1966.

[3] A. Sahai, G. Patel, C. Dick, and A. Sabharwal, "On the impact of phase noise on active cancelation in wireless full-duplex," *Vehicular Technology, IEEE Transactions on,* vol. 62, no. 9, November 2013.

[4] J. I. Choi, M. Jain, K. Srinivasan, P. Levis, and S. Katti, "Achieving single channel, full duplex wireless communication," in *Proceedings of the sixteenth annual international conference on Mobile computing and networking,* ser. MobiCom '10, 2010.

[5] M. A. Khojastepour, K. Sundaresan, S. Rangarajan, X. Zhang, and S. Barghi, "The case for antenna cancellation for scalable full-duplex wireless communications," in *Proceedings of the 10th ACM Workshop on Hot Topics in Networks,* ser. HotNets-X. ACM, 2011, pp. 17:1-17:6.

[6] M. Jain, J. I. Choi, T. Kim, D. Bharadia, S. Seth, K. Srinivasan, P. Levis, S. Katti, and P. Sinha, "Practical, real-time, full duplex wireless," in *Proceedings of the 17th annual international conference on Mobile computing and networking,* ser. MobiCom '11, 2011.

[7] L. Laughlin, M. Beach, K. Morris, and J. Haine, "Optimum single antenna full duplex using hybrid junctions," *Selected Areas in Communications, IEEE Journal on,* vol. 32, no. 9, September 2014.

[8] L. Laughlin, M. Beach, K. Morris, and J. Hainey, "Electrical balance isolation for flexible duplexing in 5g mobile devices," in *Communication Workshop (ICCW),* 2015 *IEEE International Conference on,* June 2015.

[9] L. Laughlin, C. Zhang, M. Beach, K. Morris, and J. Haine, "A widely tunable full duplex transceiver combining electrical balance isolation and active analog cancellation," in *Vehicular Technology Conference (VTC Spring),* 2015 *IEEE 81st,* May 2015.

[10] E. Everett, M. Duarte, C. Dick, and A. Sabharwal, "Empowering full-duplex wireless communication by exploiting directional diversity," in *Signals, Systems and Computers (ASILOMAR),* 2011 *Conference Record of the Forty Fifth Asilomar Conference on,* 2011, pp. 2002-2006.

[11] E. Everett, A. Sahai, and A. Sabharwal, "Passive self-interference suppression for full-duplex infrastructure nodes," *Wireless Communications, IEEE Transactions on,* vol. PP, no. 99, pp. 1-15, 2014.

[12] T. Dinc, A. Chakrabarti, and H. Krishnaswamy, "A 60 GHz same-channel full-duplex CMOS transceiver and link based on reconfigurable polarization-based antenna cancellation," in *Radio Frequency Integrated Circuits Symposium (RFIC),* 2015 *IEEE,* 2015, pp. 31-34.

[13] A. Sahai, G. Patel, and A. Sabharwal, "Pushing the limits of full-duplex: Design and real-time implementation," Rice University, Technical report, 7 2011

[14] D. Korpi, S. Venkatasubramanian, T. Riihonen, L. Anttila, S. Otewa, C. Icheln, K. Haneda, S. Tretyakov, M. Valkama, and R. Wichman, "Advanced self-interference cancellation and multiantenna techniques for full-duplex radios," in *Signals, Systems and Computers,* 2013 *Asilomar Conference on,* 11 2013, pp. 3-8.

[15] M. Heino, D. Korpi, T. Huusari, E. Antonio-Rodriguez, S. Venkatasubramanian, T. Riihonen, L. Anttila, C. Icheln, K. Haneda, R. Wichman, and M. Valkama, "Recent advances in antenna design and interference cancellation algorithms for in-band full duplex relays," *Communications Magazine, IEEE,* vol. 53, no. 5, pp. 91-101, 5 2015.

[16] K. Kolodziej, P. Hurst, A. Fenn, and L. Parad, "Ring array antenna with optimized beamformer for simultaneous transmit and receive," in *Antennas and Propagation Society International Symposium (APSURSI),* 2012 *IEEE,* 7 2012, pp. 1-2.

[17] N. A. Estep, D. L. Sounas, J. Soric, and A. Alu, "Magnetic-free non-reciprocity and isolation based on parametrically modulated coupled-resonator loops," *Nat Phys,* vol. 10, no. 12, pp. 923-927, 2014. [Online]. Available: http://dx.doi.org/10.1038/nphys3134

[18] D. Bharadia, E. McMilin, and S. Katti, "Full duplex radios," in *Proceedings of the ACM SIGCOMM* 2013 *conference on SIGCOMM,* ser. SIGCOMM '13, 2013.

[19] R. Askar, T. Kaiser, B. Schubert, T. Haustein, and W. Keusgen, "Active self-interference cancellation mechanism for full-duplex wireless transceivers," in *Cognitive Radio Oriented Wireless Networks and Communications (CROWNCOM),* 2014 *9th International Conference on,* June 2014.

[20] R. Askar, B. Schubert, W. Keusgen, and T. Haustein, "Full-Duplex wireless transceiver in presence of I/Q mismatches: Experimentation and estimation algorithm," in *IEEE GC* 2015 *Workshop on Emerging Technologies for* 5G *Wireless Cellular Networks-4th International (GC'15-Workshop-ET5G),* San Diego, USA, December 2015.

[21] M. Duarte and A. Sabharwal, "Full-duplex wireless communications using off-the-shelf radios: Feasibility and first results," in *Signals, Systems and Computers (ASILOMAR),* 2010 *Conference Record of the* 44th *Asilomar Conference on,* 2010, pp. 1558-1562.

[22] M. Duarte, C. Dick, and A. Sabharwal, "Experiment-driven characterization of full-duplex wireless systems," *Wireless Communications, IEEE Transactions on,* vol. 11, no. 12, December 2012.

[23] R. Askar, N. Zarifeh, B. Schubert, W. Keusgen, and T. Kaiser, "I/Q imbalance calibration for higher self-interference cancellation levels in full-duplex wireless transceivers," in 5G *for Ubiquitous Connectivity (5GU),* 2014 *1st International Conference on,* 2014, pp. 92-97.

[24] D. Korpi, L. Anttila, V. Syrjala, and M. Valkama, "Widely linear digital self-interference cancellation in direct-conversion full-duplex transceiver," *Selected Areas in Communications, IEEE Journal on,* vol. 32, no. 9, pp. 1674-1687, 9 2014.

[25] E. Ahmed, A. Eltawil, and A. Sabharwal, "Self-interference cancellation with nonlinear distortion suppression for full-duplex systems," in *Signals, Systems and Computers,* 2013 *Asilomar Conference on,* 2013, pp. 1199-1203.

[26] D. Korpi, T. Riihonen, V. Syrjala, L. Anttila, M. Valkama, and R. Wichman, "Full-duplex transceiver system calculations: Analysis of ADC and linearity challenges," *Wireless Communications, IEEE Transactions on,* vol. PP, no. 99, pp. 1-1, 2014.

[27] L. Anttila, D. Korpi, V. Syrjälä, and M. Valkama, "Cancellation of power amplifier induced nonlinear self-interference in full-duplex transceivers," in *Signals, Systems and Computers,* 2013 *Asilomar Conference on,* 2013, pp. 1193-1198.

[28] A. Sahai, G. Patel, C. Dick, and A. Sabharwal, "Understanding the impact of phase noise on active cancellation in wireless full-duplex," in *Signals, Systems and Computers (ASILOMAR),* 2012 *Conference Record of the Forty Sixth Asilomar Conference on,* 11 2012, pp. 29-33.

[29] E. Ahmed, A. Eltawil, and A. Sabharwal, "Self-interference cancellation with phase noise induced ici suppression for full-duplex systems," in *Global Communications Conference (GLOBECOM)*, 2013 IEEE, 2013, pp. 3384-3388.

[30] Y. Hua, Y. Ma, P. Liang, and A. Cirik, "Breaking the barrier of transmission noise in full-duplex radio," in *Military Communications Conference, MILCOM 2013-2013 IEEE*, 11 2013, pp. 1558-1563.

[31] D. Bharadia, K. R. Joshi, and S. Katti, "Full duplex backscatter," in *Proceedings of the Twelfth ACM Workshop on Hot Topics in Networks*, ser. HotNets-XII. ACM, 2013, pp. 4:1-4:7.

[32] D. Bharadia and S. Katti, "Full duplex MIMO radios," in *11th USENIX Symposium on Networked Systems Design and Implementation (NSDI 14)*. USENIX Association, April 2014.

[33] A. Gholian, Y. Ma, and Y. Hua, "A numerical investigation of all-analog radio self-interference cancellation," in *Signal Processing Advances in Wireless Communications, 2014 IEEE 15th International Workshop on*, 2014, pp. 459-463.

[34] Y. Hua, Y. Li, C. Mauskar, and Q. Zhu, "Blind digital tuning for interference cancellation in fullduplex radio," in *Signals, Systems and Computers, 2014 48th Asilomar Conference on*, 11 2014, pp. 1691-1695.

[35] Y. Hua, Y. Ma, A. Gholian, Y. Li, A. C. Cirik, and P. Liang, "Radio self-interference cancellation by transmit beamforming, all-analog cancellation and blind digital tuning," *Signal Processing*, vol. 108, 2015.

[36] J. McMichael and K. Kolodziej, "Optimal tuning of analog self-interference cancellers for fullduplex wireless communication," in *Communication, Control, and Computing (Allerton), 50th Annual Allerton Conference on*, 10 2012, pp. 246-251.

[37] K. Kolodziej, J. McMichael, and B. Perry, "Adaptive RF canceller for transmit-receive isolation improvement," in *Radio and Wireless Symposium (RWS), 2014 IEEE*, 1 2014, pp. 172-174.

[38] R. Askar, N. Zarifeh, B. Schubert, W. Keusgen, and T. Kaiser, "I/Q imbalance calibration for higher self-interference cancellation levels in full-duplex wireless transceivers," in *5G for Ubiquitous Connectivity (5GU), 2014 1st International Conference on*, November 2014.

[39] V. Syrjälä, M. Valkama, L. Anttila, T. Riihonen, and D. Korpi, "Analysis of oscillator phase-noise effects on self-interference cancellation in full-duplex ofdm radio transceivers," *Wireless Communications, IEEE Transactions on*, vol. 13, no. 6, June 2014.

[40] E. Manuzzato, J. Tamminen, M. Turunen, D. Korpi, F. Granelli, and M. Valkama, "Digitally controlled electrical balance duplexer for transmitter-receiver isolation in full-duplex radio," in *European Wireless 2016; 22th European Wireless Conference*, May 2016.

[41] D. Nie, B. M. Hochwald, and E. Stauffer, "Systematic design of large-scale multiport decoupling networks," *IEEE Transactions on Circuits and Systems I: Regular Papers*, vol. 61, no. 7, July 2014.

[42] J. Andersen and H. Rasmussen, "Decoupling and descattering networks for antennas," *IEEE Transactions on Antennas and Propagation*, vol. 24, no. 6, November 1976.

[43] Allen, J. L. & Diamond, B. L, TechReport, "MUTUAL COUPLING IN ARRAY ANTENNAS", MASSACHUSETTS INST OF TECH LEXINGTON LINCOLN LAB, MASSACHUSETTS INST OF TECH LEXINGTON LINCOLN LAB, 1966.

[44] W. Wasylkiwskyj and W. Kahn, "Theory of mutual coupling among minimum-scattering antennas," *IEEE Transactions on Antennas and Propagation*, vol. 18, no. 2, March 1970.

[45] J. W. Wallace and M. A. Jensen, "Termination-dependent diversity performance of coupled antennas: network theory analysis," *IEEE Transactions on Antennas and Propagation*, vol. 52, no. 1, January 2004.

The invention claimed is:

1. A wireless communication network entity for a wireless communication network including a plurality of wireless communication network entities, the wireless communication network entity comprising:
   a full-duplex transceiver apparatus for a communication with one or more other wireless communication network entities, the full-duplex transceiver apparatus comprising:
   a plurality of antennas, the plurality of antennas comprising a first antenna and a second antenna,
   a first transmit front-end for feeding the first antenna,
   a first receive front-end for receiving a remotely-generated signal via the second antenna, and
   a matching network between the plurality of antennas and the first transmit front-end and the first receive front-ends for feeding the first antenna from the first transmit front-end and for delivering the remotely-generated signal from the second antenna to the first receive front-end,
   wherein the matching network is a lossless reciprocal network causing a cancellation of the self-interference at the second antenna, the lossless reciprocal network comprising a first antenna port connected to the first antenna, a second antenna port connected to the second antenna, a first front-end port connected to the first transmit front-end, and a second front-end port connected the first receive front-end, and
   wherein the matching network includes a plurality of reactive components, like coils, capacitors, microstrip parts or other components having an impedance that is purely or mainly reactive so that there is substantially no energy dissipation within the matching network.

2. The wireless communication network entity of claim 1, wherein the plurality of antennas are located relative to each other such that a portion of a signal transmitted by the first antenna is coupled into the second antenna.

3. The wireless communication network entity of claim 1, wherein a portion of a signal transmitted by the first antenna is scattered back towards the full-duplex transceiver apparatus, and the back scattered signal is coupled into the second antenna.

4. The wireless communication network entity of claim 1, wherein the matching network is configured to match the driving impedance of the first and second antennas.

5. The wireless communication network entity of claim 1, wherein one or more of the reactive network components are adjustable to compensate tolerances of the reactive network components and/or to match a frequency or multiple frequencies to be used by the full-duplex transceiver.

6. The wireless communication network entity of claim 5, comprising:
   a baseband processor configured to select values for the one or more adjustable reactive network components for compensating the tolerances of the reactive network components and/or for matching the frequency or multiple frequencies to be used, and
   a controller, like a DSP core or a micro-controller, connected to the baseband processor and to an interface of the matching network, the controller configured to provide, responsive to the selected values from the baseband processor, one or more control signals for the one or more adjustable reactive network components via the interface so as to tune the one or more adjustable reactive network components accordingly.

7. The wireless communication network entity of claim 1, wherein the full-duplex transceiver apparatus comprises:
at least one further transmit front-end for feeding a further antenna,
wherein the further antenna is connected to a further antenna port of the matching network, and
wherein the further transmit front-end is connected to a further front-end port of the matching network.

8. The wireless communication network entity of claim 1, wherein the full-duplex transceiver apparatus comprises:
at least one further receive front-end for receiving a remotely-generated signal from a further antenna,
wherein the further antenna is connected to a further antenna port of the matching network, and
wherein the further receive front-end is connected to a further front-end port of the matching network.

9. The wireless communication network entity of claim 1, wherein the full-duplex transceiver apparatus comprises:
a second receive front-end for receiving a remotely-generated signal from the first antenna, and
a non-reciprocal device comprising a first terminal connected to the first front-end port of the matching network, a second terminal connected to the first transmit front-end and a third terminal connected to the second receive front-end.

10. The wireless communication network entity of claim 1, wherein the full-duplex transceiver apparatus comprises:
a second transmit front-end for feeding the second antenna, and
a non-reciprocal device comprising a first terminal connected to the second front-end port of the matching network, a second terminal connected to the first receive front-end and a third terminal connected to the second transmit front-end.

11. The wireless communication network entity of claim 1, wherein the full-duplex transceiver apparatus comprises:
a second receive front-end for receiving a remotely-generated signal from the first antenna, the second receive front-end connected to a further front-end port of the matching network, and
a non-reciprocal device comprising a first terminal connected to the first antenna, a second terminal connected to the first antenna port of the matching network and a third terminal connected to a further antenna port of the matching network.

12. The wireless communication network entity of claim 1, wherein the full-duplex transceiver apparatus comprises:
a second transmit front-end for feeding the second antenna, the second transmit front-end connected to a further front-end port of the matching network, and
a non-reciprocal device comprising a first terminal connected to the second antenna, a second terminal connected to the second antenna port of the matching network and a third terminal connected to a further antenna port of the matching network.

13. The wireless communication network entity of claim 1, wherein the full-duplex transceiver apparatus comprises:
a second receive front-end for receiving a remotely-generated signal from the first antenna, and
a non-reciprocal device,
wherein the matching network comprises a distributed network comprising a first network and a second network, the first network comprising a plurality of antenna ports and a plurality of output ports, the plurality of antenna ports comprising the first antenna port and the second antenna port, and the second network comprising a plurality of output ports and a plurality of front-end ports, the plurality of front-end ports comprising the first front-end port and the second front-end port,
wherein the second receive front-end is connected to a further front-end port of the second network, and
wherein the non-reciprocal device comprises a first terminal connected to an output port of the first network, a second terminal connected to a first input port of the second network and a third terminal connected to a second input port of the second network.

14. The wireless communication network entity of claim 1, wherein the full-duplex transceiver apparatus comprises:
a second transmit front-end for feeding the second antenna, and
a non-reciprocal device,
wherein the matching network comprises a distributed network comprising a first network and a second network, the first network comprising a plurality of antenna ports and a plurality of output ports, the plurality of antenna ports comprising the first antenna port and the second antenna port, and the second network comprising a plurality of output ports and a plurality of front-end ports, the plurality of front-end ports comprising the first front-end port and the second front-end port,
wherein the second transmit front-end is connected to a further front-end port of the second network, and
wherein the non-reciprocal device comprises a first terminal connected to an output port of the first network, a second terminal connected to a first input port of the second network and a third terminal connected to a second input port of the second network.

15. The wireless communication network entity of claim 9, wherein the non-reciprocal device comprises a circulator.

16. The wireless communication network entity of claim 1, wherein the plurality of antennas comprises one or more antenna arrays, the antenna array comprising a plurality of antenna elements.

17. The wireless communication network entity of claim 1, wherein the full-duplex transceiver apparatus is configured to implement one or more additional self-interference cancellation approaches.

* * * * *